US009744459B2

(12) United States Patent
Mizuta

(10) Patent No.: US 9,744,459 B2
(45) Date of Patent: Aug. 29, 2017

(54) COMPUTER-READABLE STORAGE MEDIUM STORING INFORMATION PROCESSING PROGRAM, INFORMATION PROCESSING DEVICE, INFORMATION PROCESSING SYSTEM, AND INFORMATION PROCESSING METHOD

(75) Inventor: Masato Mizuta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1252 days.

(21) Appl. No.: 13/424,701

(22) Filed: Mar. 20, 2012

(65) Prior Publication Data
US 2013/0120569 A1 May 16, 2013

(30) Foreign Application Priority Data
Nov. 11, 2011 (JP) .................................. 2011-247126

(51) Int. Cl.
H04R 5/00 (2006.01)
H04N 7/18 (2006.01)
A63F 13/54 (2014.01)
A63F 13/5255 (2014.01)

(52) U.S. Cl.
CPC .......... *A63F 13/54* (2014.09); *A63F 13/5255* (2014.09); *A63F 2300/6081* (2013.01)

(58) Field of Classification Search
CPC .................. A63F 13/54; A63F 13/5255; A63F 2300/6081
USPC ............................. 348/143; 381/17, 300, 306
See application file for complete search history.

(56) References Cited

U.S. PATENT DOCUMENTS

| | | | |
|---|---|---|---|
| 5,754,660 A | 5/1998 | Shimizu | |
| 5,862,229 A | 1/1999 | Shimizu | |
| 6,035,045 A | 3/2000 | Fujita et al. | |
| 7,113,610 B1* | 9/2006 | Chrysanthakopoulos | .... 381/309 |
| 7,480,386 B2 | 1/2009 | Ogata | |
| 2004/0110561 A1 | 6/2004 | Kawamura | |

(Continued)

FOREIGN PATENT DOCUMENTS

JP 10-63470 3/1998
JP 10-126898 5/1998

(Continued)

OTHER PUBLICATIONS

Office Action (14 pgs.) dated Apr. 7, 2014 issued in co-pending U.S. Appl. No. 13/425,780.

(Continued)

*Primary Examiner* — Jamie Atala
*Assistant Examiner* — On S Mung
(74) *Attorney, Agent, or Firm* — Nixon & Vanderhye PC

(57) ABSTRACT

An example game device includes a virtual camera, a localization calculation microphone, and a volume calculation microphone in a virtual space. The localization calculation microphone is provided at the location of the virtual camera, and the volume calculation microphone is located away from the virtual camera. The game device calculates a left-right position and a front-back position of a sound source as viewed from the localization calculation microphone. The game device also calculates the volume of a sound based on a distance between the volume calculation microphone and the sound source. The game device outputs the sound based on the calculated localized position and volume.

20 Claims, 12 Drawing Sheets

(56) References Cited

U.S. PATENT DOCUMENTS

| | | | |
|---|---|---|---|
| 2005/0187015 A1* | 8/2005 | Suzuki et al. | 463/32 |
| 2005/0237323 A1* | 10/2005 | Shimamura et al. | 345/419 |
| 2006/0067534 A1* | 3/2006 | Mizuta et al. | 381/1 |
| 2009/0137314 A1 | 5/2009 | Nakayama | |
| 2009/0244064 A1* | 10/2009 | Inokuchi et al. | 345/420 |
| 2010/0260355 A1* | 10/2010 | Muraoka et al. | 381/107 |

FOREIGN PATENT DOCUMENTS

| | | |
|---|---|---|
| JP | 2004-195210 | 7/2004 |
| JP | 2006-230578 | 9/2006 |
| JP | 2008-194208 | 8/2008 |

OTHER PUBLICATIONS

U.S. Appl. No. 13/425,780, filed Mar. 21, 2012.
Final Office Action issued in co-pending U.S. Appl. No. 13/425,780, mailed Aug. 18, 2014 (20 pages).
U.S. Appl. No. 13/425,780, filed Mar. 21, 2012, Computer-Readable Storage Medium Storing Information Processing Program, Information Processing Device, Information Processing System, and Information Processing Method.

\* cited by examiner

F I G. 1
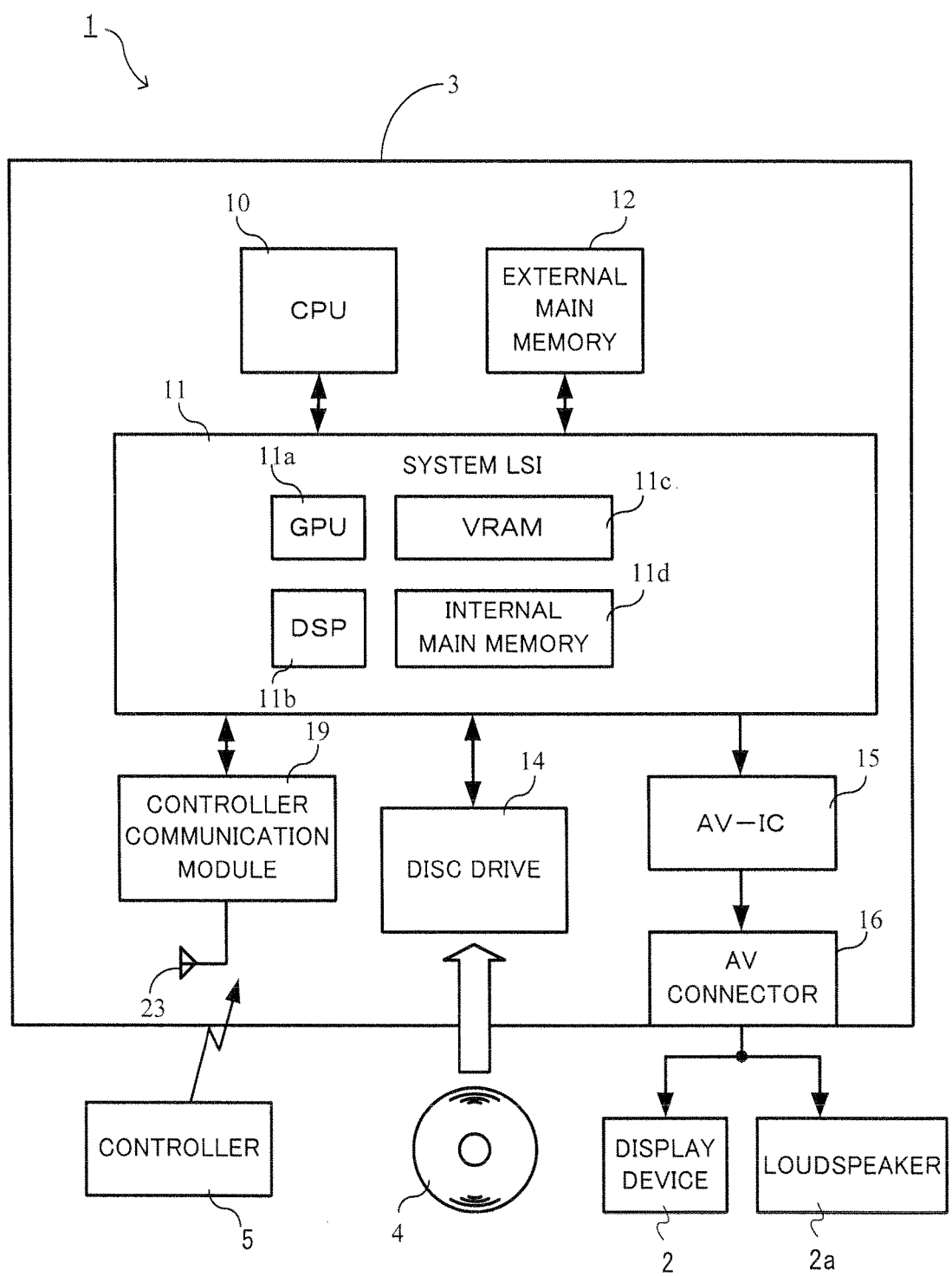

COMPUTER-READABLE STORAGE MEDIUM STORING INFORMATION PROCESSING PROGRAM, INFORMATION PROCESSING DEVICE, INFORMATION PROCESSING SYSTEM, AND INFORMATION PROCESSING METHOD

CROSS REFERENCE TO RELATED APPLICATION

The disclosure of Japanese Patent Application No. 2011-247126, filed Nov. 11, 2011, is incorporated herein by reference.

FIELD

The technology disclosed herein relates to information processing programs, information processing devices, information processing systems, and information processing methods for controlling sounds.

BACKGROUND AND SUMMARY

Conventionally, an object (sound source) is displayed so that it appears to be provided in a virtual three-dimensional space and generate a sound. To do so, a process is executed so that the sound is heard from a direction in which the object is located.

In conventional techniques, a sound is output based on the direction and distance of a sound source which are determined as viewed from a virtual camera. Therefore, for example, there is room for improvement with regard to enabling a user to more easily localize or identify a sound from an object or area to which the user desires or is required to pay attention.

Therefore, it is an object of an exemplary embodiment to provide an information processing program, information processing device, information processing system, and information processing method which perform a novel process on a sound of a sound source in an environment in which the sound source is provided in a virtual space.

In order to achieve the object, exemplary embodiments have configurations as follows.

An exemplary embodiment is a computer-readable storage medium storing an information processing program executable by a computer of an information processing device for outputting a sound of a sound source in a virtual space. The program causes the computer to execute calculating a direction of the sound source with reference to a first location in the virtual space, calculating a volume of the sound based on a second location different from the first location and a location of the sound source, and outputting the sound of the sound source based on the calculated direction and volume.

With the above configuration, the direction of the sound source is calculated with reference to the first location, and the volume of the sound is calculated based on the second location and the location of the sound source. Thereafter, the sound is output based on the calculated direction and volume. As a result, for example, the volume of the sound of the sound source can be changed while a location relationship between the first location and the sound source is maintained.

In another configuration, the program may cause the computer to further execute displaying, on a display device, an image of the virtual space captured by a virtual camera. The first location may be set based on a location of the virtual camera.

With this configuration, the image of the virtual space captured by the virtual camera is displayed. The first location is set based on the location of the virtual camera. As a result, for example, the volume of the sound source to which attention should be paid can be increased while a location relationship between the virtual camera and the sound source is correctly maintained.

In another configuration, the second location may be set to a predetermined location within an imaging range of the virtual camera.

With this configuration, the second location is set to a predetermined location within the imaging range of the virtual camera. As a result, for example, the sound corresponding to a displayed image can be output, i.e., the volume of a sound in a region which can be viewed by the user can be increased while the volume of a sound in a region which cannot be viewed by the user can be decreased.

In another configuration, the second location may be set based on a gazing point of the virtual camera.

With this configuration, the sound of a sound source located in the vicinity of the second location set based on the gazing point of the virtual camera can be increased. For example, the user is allowed to pay attention to the sound source both visually and auditorily.

In another configuration, the second location may be set between the gazing point of the virtual camera and the virtual camera.

With this configuration, the second location is set between the gazing point of the virtual camera and the virtual camera. Therefore, a satisfactory balance can be provided between the volume of a sound of a sound source around the virtual camera and the volume of a sound of a sound source around the gazing point.

In another configuration, the second location may be set in the vicinity of the gazing point of the virtual camera.

With this configuration, the volume of a sound of a sound source located in the vicinity of the gazing point of the virtual camera can be increased.

In another configuration, the program may cause the computer to further execute controlling the virtual camera based on a user's operation, controlling the virtual camera without the user's operation, and switching a control mode of the virtual camera between a first control mode in which the virtual camera is controlled based on the user's operation and a second control mode in which the virtual camera is controlled without the user's operation. The second location may be set between the gazing point of the virtual camera and the virtual camera in the first control mode, and in the vicinity of the gazing point of the virtual camera in the second control mode.

With this configuration, the control mode can be switched between the first control mode and the second control mode, and the second location is set based on the control mode.

In another configuration, an operation object set in the virtual space may be controlled based on the user's operation.

With this configuration, the operation object as well as the virtual camera can be controlled by the user's operation.

In another configuration, the first location may be set to a location of the virtual camera.

With this configuration, the direction of a sound source is calculated with reference to the virtual camera. Therefore, the way in which a sound of the sound source is heard can be changed based on the direction of the sound source as viewed from the virtual camera, and the volume of the sound can be changed based on the second location different from the location of the virtual camera.

In another configuration, a localized position of the sound source may be calculated with reference to the first location.

In another configuration, the volume of the sound may be calculated so that the volume of the sound decreases with increasing distance between the second location and the sound source.

With this configuration, the volume of the sound can be decreased as the sound source is located further away from the second location.

In another configuration, the program may cause the computer to further execute calculating a relative motion of the sound source with reference to a third location fixed or movable in the virtual space. The sound corrected based on the relative motion may be output.

Here, the third location may be fixed or movable in the virtual space. In other words, the sound may be corrected as the third location moves, as the sound source moves, or as both the third location and the sound source move.

With this configuration, the sound can be corrected based on a relative motion of the sound source with reference to the third location. For example, the sound can be corrected, taking the Doppler effect into consideration.

In another configuration, a player object controllable based on the user's operation may be provided in the virtual space. In this case, the first location may be set based on a location of the player object.

With this configuration, for example, the second location can be changed while a location relationship between the player object and the sound source is maintained, and the volume of a sound of the sound source to which the user should pay attention can be increased.

An exemplary embodiment may be an information processing device (information processing system) for executing the above information processing program. The information processing system may include a single device or a plurality of devices which operate in cooperation with each other. An exemplary embodiment may be an information processing method executable in the information processing system.

According to an exemplary embodiment, a novel process can be performed on a sound of a sound source in an environment in which the sound source is provided in a virtual space.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is an example non-limiting block diagram showing a configuration of a game system 1;

DETAILED DESCRIPTION OF NON-LIMITING EXAMPLE EMBODIMENTS

[1. General Configuration of Game System]

Figure 2:
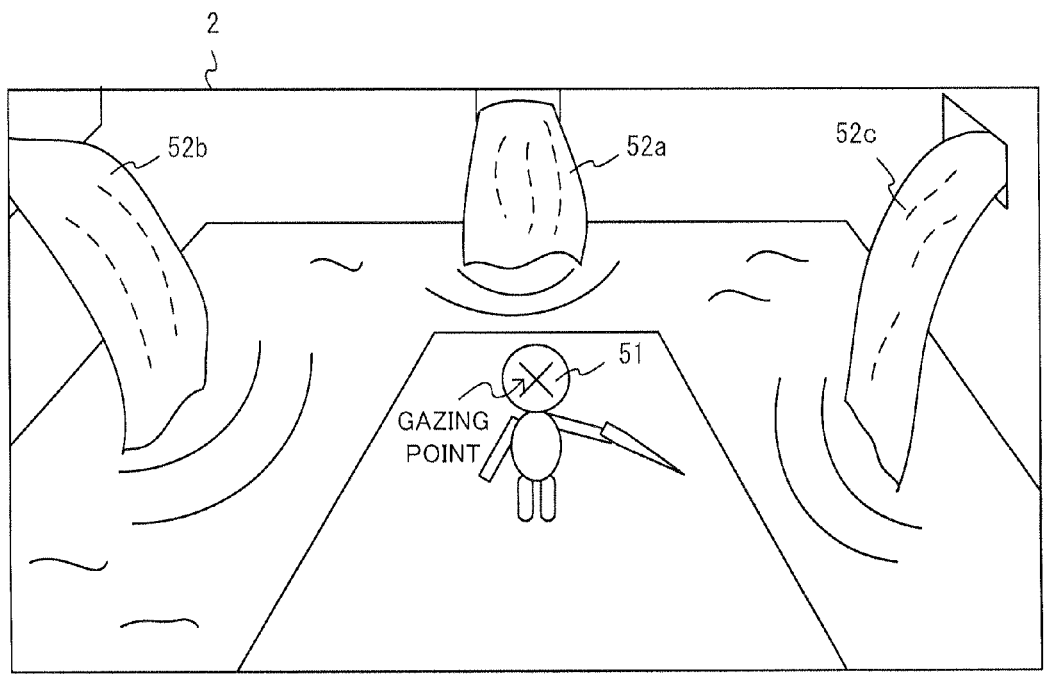
FIG. 2 is an example non-limiting diagram showing video (image) which is displayed on a television 2 when a game of this embodiment is executed.

A game system 1 according to an exemplary embodiment will be described hereinafter with reference to the accompanying drawings. FIG. 1 is an example non-limiting block diagram showing a configuration of the game system 1. In FIG. 1, the game system 1 includes a display device (e.g., a television receiver (hereinafter referred to as a "television")) 2, a game device 3, an optical disc 4, and a controller 5. In the game system 1, a game process is performed by the game device 3 based on a game operation performed using the controller 5, and a game image obtained through the game process is displayed on the television 2.

In the game device 3, the optical disc 4 typifying an interchangeable information storage medium used for the game device 3 is removably inserted. An information processing program (typically, a game program) to be executed by the game device 3 is stored on the optical disc 4.

The television 2 is connected to the game device 3 by a connecting cord. A game image obtained as a result of a game process performed by the game device 3 is displayed on the television 2. The television 2 includes a loudspeaker 2a which outputs a game sound obtained as a result of the game process. In alternative embodiments, the loudspeaker 2a may be separated from the television 2. The game sound may be output from a monaural loudspeaker or a stereo loudspeaker. Alternatively, the game sound may be output from a 5.1 channel surround sound loudspeaker.

The controller 5 provides the game device 3 with operation data produced based on an operation performed on the controller itself. The controller 5 and the game device 3 can communicate with each other via wireless (or wired) communication. While only one controller is included in the game system 1 in FIG. 1, a plurality of the controllers 5 may be included in the game system 1.

The controller 5 has a plurality of operation buttons (e.g., a cross button for selecting a direction, a plurality of push buttons, etc.). Information about an operation on the operation buttons performed by a user is transmitted as operation data from the controller 5 to the game device 3.

The game device 3 includes a CPU 10, a system LSI 11, an external main memory 12, a disc drive 14, an AV-IC 15, etc.

The CPU 10 performs a game process by executing the above game program, and functions as a game processor. The CPU 10 is connected to the system LSI 11. In addition to the CPU 10, the external main memory 12, the disc drive 14, and the AV-IC 15 are connected to the system LSI 11. The system LSI 11 performs the following processes: controlling data transfer between each component connected thereto; generating an image to be displayed; acquiring data from an external device(s); and the like. The external main memory 12, which is of a volatile type, stores a game program read from the optical disc 4 and various kinds of data. The external main memory 12 is used as a work area and a buffer area for the CPU 10. The disc drive 14 reads program data, audio data, etc. from the optical disc 4, and writes the read data into an internal main memory 11d or the external main memory 12.

The system LSI 11 includes a graphics processor unit (GPU) 11a, a digital signal processor (DSP) 11b, a video RAM (VRAM) 11c, and the internal main memory 11d. Although not shown in the figures, these components 11a to 11d are connected to each other by an internal bus.

The GPU 11a, which forms a part of a drawing or rendering mechanism, generates an image in accordance with a graphics command (drawing or rendering command) from the CPU 10. The VRAM 11c stores data (data such as polygon data and texture data, etc.) required by the GPU 11a to execute graphics commands.

The DSP 11c, which functions as an audio processor, generates audio data to be played back, using sound data and tone quality data stored in the internal main memory 11d or the external main memory 12.

Image data and audio data generated by the game device 3 are read out by the AV-IC 15. The AV-IC 15 outputs the read image data to the television 2 via an AV connector 16, and outputs the read audio data to the loudspeaker 2a provided in the television 2. Thus, an image is displayed on the television 2 while sound is output from the loudspeaker 2a.

The game device 3 can receive operation data from the controller 5. Specifically, the system LSI 11 receives operation data transmitted from the controller 5 via the antenna 23 and the controller communication module 19, and stores (temporarily) the data in a buffer area of the internal main memory 11d or the external main memory 12.

Note that the game system 1 is merely illustrative, and a game process (information process) described below may be performed by any system.

(General Description of Game Process)

Next, a game process executable in the game system 1 of this embodiment will be generally described. FIG. 2 is an example non-limiting diagram showing video (image) which is displayed on the television 2 when a game of this embodiment is executed. As shown in FIG. 2, a player character 51, and a sound source 52a, a sound source 52b, and a sound source 52c (hereinafter also simply collectively referred to as a "sound source 52"), are displayed on the television 2. In this embodiment, the player character 51 is provided in a three-dimensional game space (virtual space). An image of the game space is captured by a virtual camera provided behind the player character 51. The image containing the player character 51 is displayed on the television 2. A gazing point of the virtual camera is set to a head portion of the player character 51. A player plays the game by moving the player character 51 in the game space or killing or beating an enemy character appearing in the game space using the controller 5. In the game of this embodiment, a variety of game scenes are prepared. For example, there are a game scene that the player character 51 is surrounded by waterfalls and a river (FIG. 2), a game scene that the player 51 is in a cave, etc.

The sound source 52 is a virtual object provided in the game space, and more specifically, a waterfall object which appears to emit a sound. A sound of the sound source 52 is actually output from the loudspeaker 2a so that it appears that the sound is generated at the location of the sound source 52 (a predetermined location in a region where the waterfall object is displayed), and the game device 3 collects the sound using a virtual microphone provided in the game space, before the sound is output from the loudspeaker 2a.

Figure 3:
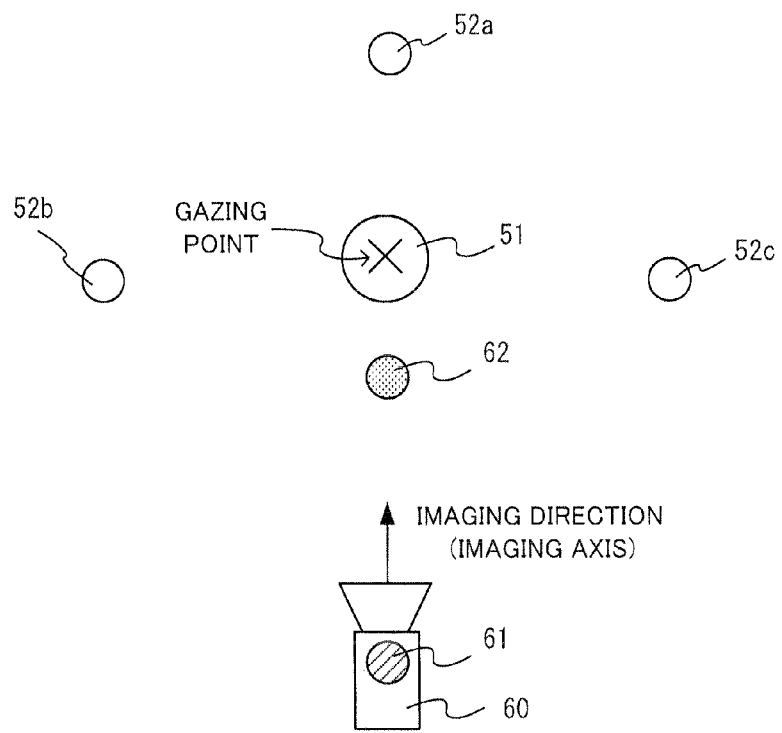
FIG. 3 is an example non-limiting diagram showing each object in a game space as viewed from above, indicating a location relationship between each object in the game space.

FIG. 3 is an example non-limiting diagram showing each object in the game space as viewed from above, indicating a location relationship between each object in the game space. As shown in FIG. 3, the sound sources 52a-52c are provided around the player character 51, and a virtual camera 60 is provided at a predetermined distance from the player character 51. In the game space, a localization calculation microphone 61 and a volume calculation microphone 62 are also provided. The localization calculation microphone 61 is located at the location of the virtual camera 60. The volume calculation microphone 62 is located on an imaging axis of the virtual camera 60 at a predetermined location (e.g., a middle) between the gazing point of the virtual camera 60 (the location of the player character 51) and the virtual camera 60. When the player moves the player character 51 in the game space or changes the orientation of the player character 51 using the controller 5 (e.g., the cross button of the controller 5), the location and orientation of the virtual camera 60 are changed. In the example of FIG. 3, the gazing point of the virtual camera 60 is fixed to the head portion of the player character 51, and is moved as the player character 51 moves.

The localization calculation microphone 61 is used to localize, or calculate the location of, the sound source 52. The localization calculation microphone 61 is not displayed on the television 2. Here, the location of the sound source 52 is information about a location relationship between the localization calculation microphone 61 (the virtual camera 60) and the sound source 52, i.e., a relative location of the sound source 52 with reference to the localization calculation microphone 61 (the term "location" in this sense is referred to as a "localized position"). The localized position of the sound source 52 may be information indicating a direction of the sound source 52 with reference to the localization calculation microphone 61 or information indicating the direction and distance of the sound source 52 with reference to the localization calculation microphone 61. In this embodiment, the localized position of the sound source 52 is information indicating the direction of the sound source 52 with reference to the localization calculation microphone 61 (as viewed from the localization calculation microphone 61), and is specifically represented as a left-right position and a front-back position described below. The volume calculation microphone 62 is used to calculate a volume (e.g., an amplitude etc.) of a sound of a sound source. The volume calculation microphone 62 is not display on the television 2. The localization calculation and the volume calculation will be described below.

Figure 4:
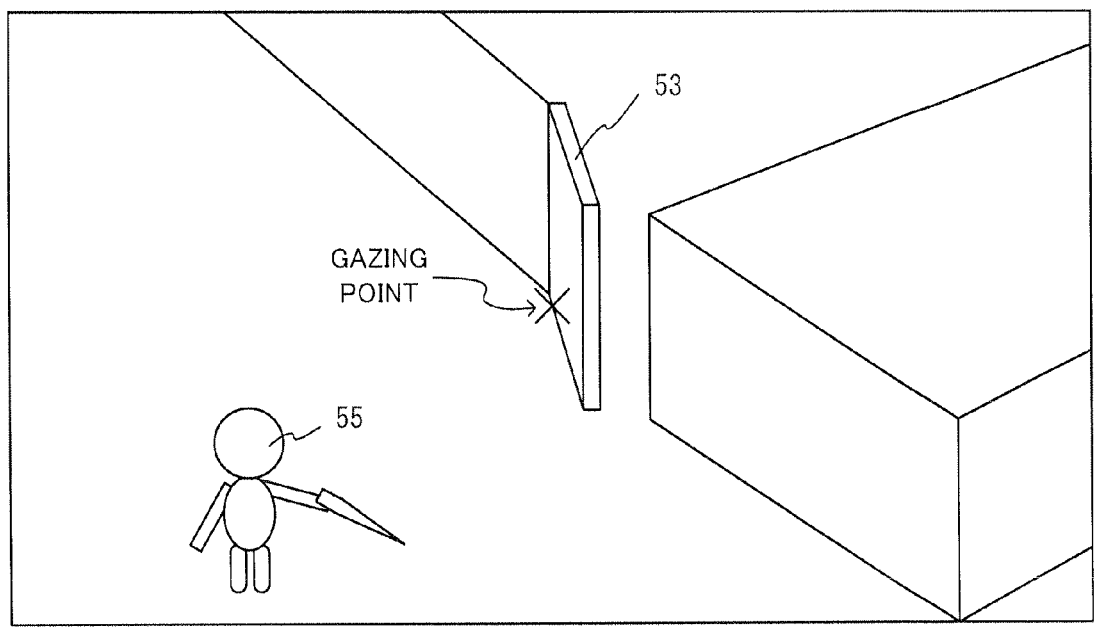
FIG. 4 is an example non-limiting diagram showing another example video (image) displayed on the television 2 when the game of this embodiment is executed.

FIG. 4 is an example non-limiting diagram showing another example video (image) displayed on the television 2 when the game of this embodiment is executed. As shown in FIG. 4, in another scene of the game of this embodiment, a character 55 moves in the game space surrounded by a wall object. In the example of FIG. 4, the character 55, the location, orientation, and gazing point of the virtual camera 60, and other objects provided in the game space are automatically controlled by the game device 3 irrespective of the player's operation. The game of this embodiment is executable in a player operation mode (FIG. 2) in which the game proceeds while the player character 51 is controlled by the player's operation and in a demonstration mode (FIG. 4) in which the game proceeds while the character 55 is moved and the gazing point of the virtual camera is changed without the player's operation. Note that the character 55 may or may not be the player character 51. In the demonstration mode, the character 55 may not be displayed and the virtual camera 60 may be automatically moved in the game space so that an audience is caused to view video of other objects in the game space or listen to sounds.

For example, the game scene of FIG. 4 shows a door object (sound source 53) which is being automatically opened. Here, as the door object (the sound source 53) is being opened, a sound occurs which is similar to a sound generated when an actual door is being opened. In other words, the sound source 53 is a virtual object serving as a sound source which appears to generate a sound. Also, when the door object (the sound source 53) is automatically opened, the gazing point of the virtual camera 60 is moved from the head portion of the character 55 to somewhere in the vicinity of the sound source 53.

Figure 5:
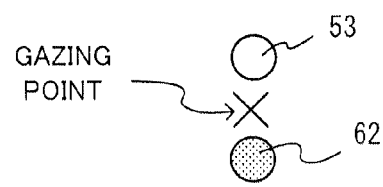
FIG. 5 is an example non-limiting diagram showing each object in the game space as viewed from above when the image of FIG. 4 is displayed, indicating a location relationship between each object provided in the game space.
Figure 5:
Figure 5:
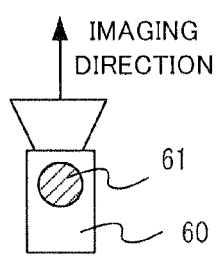

FIG. 5 is an example non-limiting diagram showing each object in the game space as viewed from above when the image of FIG. 4 is displayed, indicating a location relationship between each object provided in the game space. As shown in FIG. 5, the gazing point of the virtual camera 60 is located in the vicinity of the sound source 53, and the volume calculation microphone 62 is located in the vicinity of the gazing point. The volume of a sound of the sound source 53 is determined based on a distance between the volume calculation microphone 62 and the sound source 53. Because the volume calculation microphone 62 is located in the vicinity of the sound source 53, the loudspeaker 2a outputs a relatively large volume of sound (a sound effect which occurs when a door is being opened). The volume calculation microphone 62 is fixed at a predetermined location in the vicinity of the gazing point of the virtual camera 60. If, in the scene of FIG. 4, the gazing point of the virtual camera 60 is located at the head portion of the character 55, the distance between the volume calculation microphone 62 and the sound source 53 is relatively large because the volume calculation microphone 62 is also located in the vicinity of the character 55. Therefore, if the gazing point of the virtual camera 60 is located at the head portion of the character 55, the loudspeaker 2a outputs a relatively small volume of sound. Actually, however, as shown in FIGS. 4 and 5, the gazing point of the virtual camera 60 is set in the vicinity of the sound source 53, the loudspeaker 2a outputs a relatively large volume of sound when the door object (the sound source 53) is being opened.

The gazing point of the virtual camera 60 is changed based on the player's operation or is automatically changed by the game device 3. For example, in the player operation mode (FIG. 2), the gazing point of the virtual camera 60 is fixed at the head portion of the player character 51, and therefore, when the player moves the player character 51 using the controller 5, the gazing point of the virtual camera 60 is also moved. The volume calculation microphone 62 is set at a location between the virtual camera 60 and the player character 51 which is determined based on the gazing point of the virtual camera 60. As the player character 51 is moved by the player's operation, the volume calculation microphone 62 is also moved. Therefore, the volume of a sound of a sound source located around the player character 51 is allowed to be relatively large.

In the demonstration mode (FIG. 4), the gazing point of the virtual camera 60 is automatically changed by the game device 3, and the volume calculation microphone 62 is fixed in the vicinity of the gazing point of the virtual camera 60. In the demonstration mode, a game creator may want the player (audience) to pay attention to a specific object in some game scenes, and produce a program which causes the gazing point of the virtual camera 60 to move to the specific object. For example, as shown in FIG. 4, in a game scene that the door object (the sound source 53) is automatically opened so that the character 55 is guided along a path ahead of the sound source 53, the gazing point of the virtual camera 60 is set in the vicinity of the sound source 53 in order to cause the audience to pay attention to the door object. In such a game scene, the gazing point of the virtual camera 60 is set in the vicinity of the door object, and the volume of a sound of the sound source 53 output from the loudspeaker 2a is set to be relatively large. As a result, the audience is allowed to pay attention to the door object.

In the player operation mode and the demonstration mode, the gazing point of the virtual camera 60 may be allowed to be set at a specific object by an operation performed by the player (or the audience). When the player (or the audience) performs an operation to set the gazing point of the virtual camera 60 at a specific object, the player (or the audience) may desire to pay attention to the object. Therefore, by setting the volume of a sound of the specific object output from the loudspeaker 2a to be relatively large, the player (or the audience) is allowed to pay attention to the object.

Figure 6:
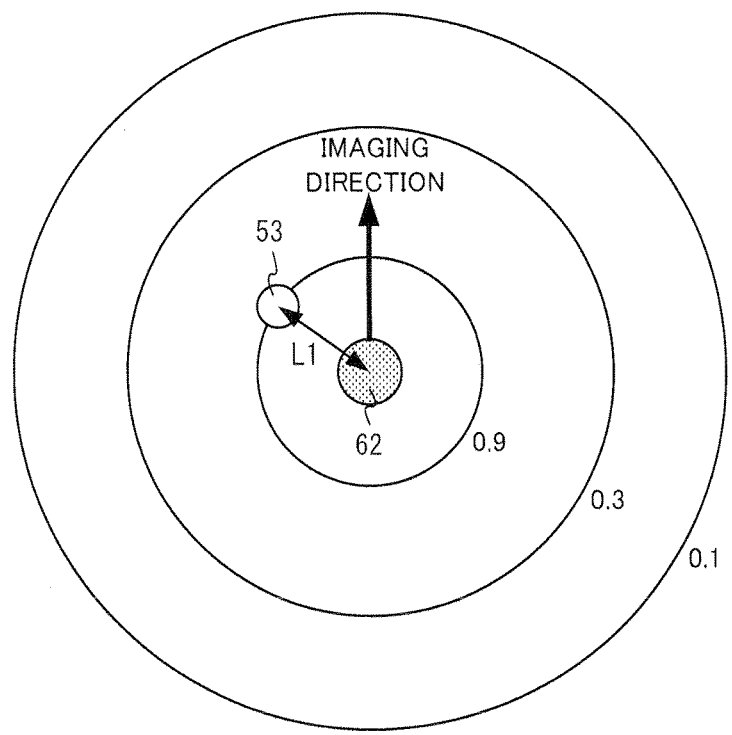
FIG. 6 is an example non-limiting diagram showing the volume of a sound of a sound source 53 which is determined based on a distance between a volume calculation microphone 62 and a sound source 53.

Next, the localization calculation and the volume calculation will be described with reference to FIGS. 6-9. FIG. 6 is an example non-limiting diagram showing the volume of a sound of the sound source 53 which is determined based on the distance between the volume calculation microphone 62 and the sound source 53. As shown in FIG. 6, the volume of a sound of the sound source 53 varies depending on the distance between the volume calculation microphone 62 and the sound source 53. The volume of a sound of the sound source 53 is determined within the range of, for example, 0 to 1.0. For example, when the sound source 53 and the volume calculation microphone 62 are located at the same location, the volume of a sound of the sound source 53 is set to the maximum value of 1.0. When the sound source 53 is located at a predetermined distance or more from the volume calculation microphone 62, the volume of a sound of the sound source 53 is set to zero, and in this case, the loudspeaker 2a does not output the sound. For example, the volume of a sound of the sound source 53 may be set to be proportional to the distance between the volume calculation microphone 62 and the sound source 53. For example, as shown in FIG. 6, when the distance between the volume calculation microphone 62 and the sound source 53 is L1, the volume of a sound of the sound source 53 is set to 0.9. Specifically, when the sound source 53 is located at any location on a circle having a radius of L1 with the center of the circle located at the volume calculation microphone 62, the volume of a sound of the sound source 53 is set to 0.9. Similarly, the volume of a sound of the sound source 52 (waterfall object) varies depending on a distance between the sound source 52 and the volume calculation microphone 62. The volume of the same sound of the same sound source is determined based on the distance between the volume calculation microphone 62 and the sound source, and the volumes of sounds of different sound sources may be determined separately. For example, when the sound source 52 and the sound source 53 are located at equal distances from the volume calculation microphone 62, the volume of a sound of the sound source 52 output from the loudspeaker 2a may be larger than the volume of a sound of the sound source 53 output from the loudspeaker 2a. For example, each sound source may be set to have a base volume, and the game device 3 may multiply the base volume by a coefficient varying depending on the distance between the sound source and the volume calculation microphone 62 (a coefficient varying within the range of 0 to 1.0, depending on the distance) to calculate a volume corresponding to the distance. A single sound source may output different sounds which have different base volumes. In this case, the game device 3 may multiply the base volumes of the different sounds by a coefficient corresponding to the distance between the sound source and the volume calculation microphone 62 to calculate the respective volumes corresponding to the distance.

Figure 7:
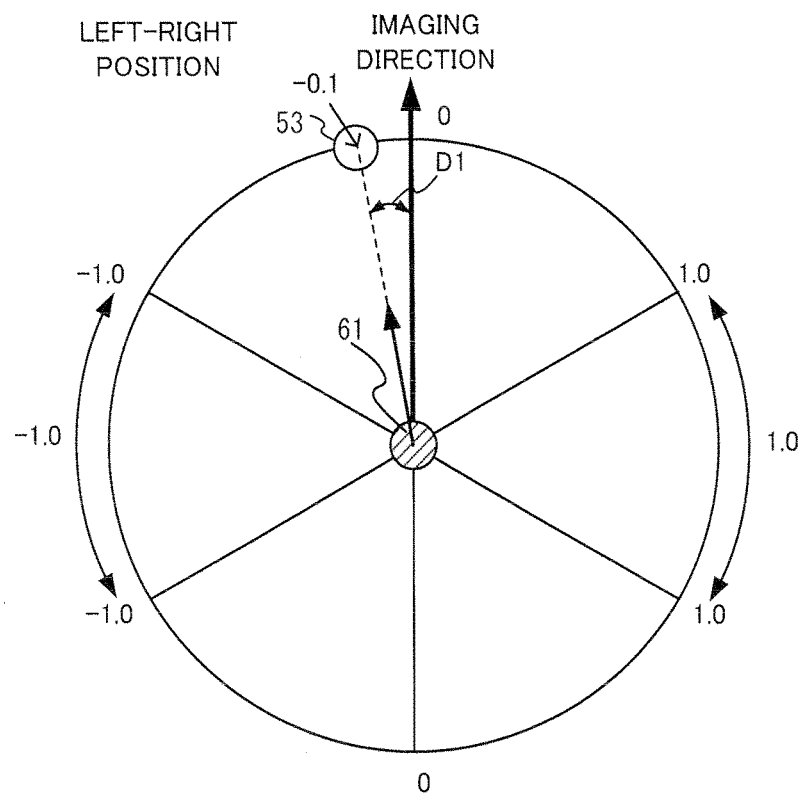
FIG. 7 is an example non-limiting diagram showing determination (left-right localization) of a localized position in a left-right direction (left-right position) of the sound source 53.

FIG. 7 is an example non-limiting diagram showing determination (left-right localization) of a localized position in a left-right direction (left-right position) of the sound source 53. The sound source 53 is localized based on a location relationship between the sound source 53 and the localization calculation microphone 61. Specifically, the localized position of the sound source 53 indicates a relative location and orientation of the sound source 53 as viewed from the localization calculation microphone 61 (with reference to the localization calculation microphone 61). More specifically, the localized position of the sound source 53 is represented by a left-right position and a front-back position.

The left-right position of the sound source 53 indicates how far the sound source 53 is located away from the localization calculation microphone 61 (the virtual camera 60) in the left-right direction, i.e., indicates the left-right direction of the sound source 53 with reference to the localization calculation microphone 61 (the virtual camera 60). Specifically, the left-right position of the sound source 53 is determined based on an angle D1 between an imaging direction vector of the virtual camera 60 and a vector from the localization calculation microphone 61 toward the sound source 53. It is assumed that an angle measured clockwise from the imaging direction (zero degrees) of the virtual camera 60 is a positive angle. For example, when the sound source 53 has an angle D1 within the range of 60 to 120 degrees, the left-right position of the sound source 53 is determined to be 1.0. For example, when the sound source 53 has an angle D1 within the range of −60 to −120 degrees, the left-right position of the sound source 53 is determined to be −1.0. When the sound source 53 has an angle D1 of 0 to 60 degrees, the left-right position of the sound source 53 is determined within the range of 0 to 1.0. For example, the left-right position of the sound source 53 may be determined by a sine function which takes the angle D1 as a parameter or may be determined in proportion to the value of the angle D1. When the sound source 53 has an angle D1 of 0 to −60 degrees, the left-right position of the sound source 53 may be determined within the range of 0 to −1.0. For example, the left-right position of the sound source 53 may be determined by a sine function which takes the angle D1 as a parameter or may be determined in proportion to the value of the angle D1. When the sound source 53 has an angle D1 of 120 to 180 degrees, the left-right position of the sound source 53 may be determined within the range of 1.0 to 0, and when the sound source 53 has an angle D1 of −120 to −180 degrees, the left-right position of the sound source 53 may be determined within the range of −1.0 to 0. For example, in the case of FIG. 7, the sound source 53 is located leftward away by a small amount from the localization calculation microphone 61 in the left-right direction, i.e., has a small negative angle D1, and therefore, the left-right position of the sound source 53 is −0.1.

Figure 8:
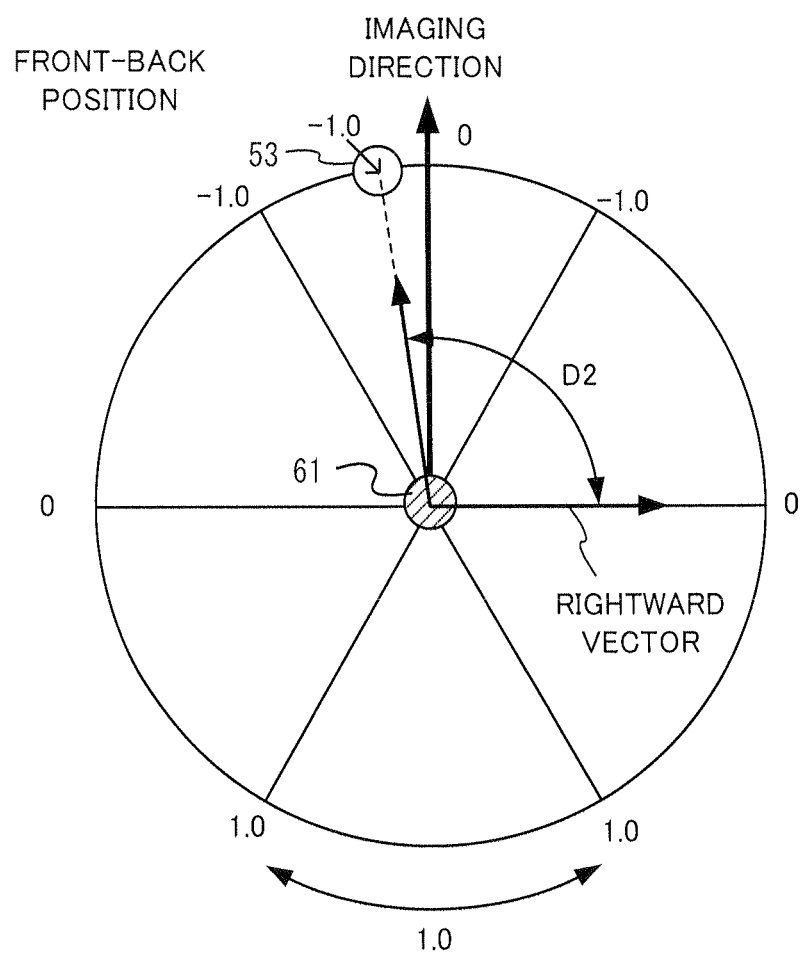
FIG. 8 is an example non-limiting diagram showing determination (front-back localization) of a localized position in a front-back direction (front-back position) of the sound source 53.

FIG. 8 is an example non-limiting diagram showing determination (front-back localization) of a localized position in a front-back direction (front-back position) of the sound source 53. The front-back position of the sound source 53 indicates how far the sound source 53 is located away from the localization calculation microphone 61 (the virtual camera 60) in the front-back direction, i.e., indicates the front-back direction of the sound source 53 with reference to the localization calculation microphone 61 (the virtual camera 60). Specifically, the front-back position of the sound source 53 is determined based on an angle D2 between a rightward vector relative to the imaging direction of the virtual camera 60 and a vector from the localization calculation microphone 61 toward the sound source 53. It is assumed that an angle measured clockwise from the direction (zero degrees) of the rightward vector is a positive angle. For example, when the sound source 53 has an angle D2 within the range of 60 to 120 degrees, the front-back position of the sound source 53 is determined to be 1.0. For example, when the sound source 53 has an angle within the range of −60 to −120 degrees, the front-back position of the sound source 53 is determined to be −1.0. When the sound source 53 has an angle D2 of 0 to 60 degrees, the front-back position of the sound source 53 is determined within the range of 0 to 1.0. For example, the front-back position of the sound source 53 may be determined by a sine function which takes the angle D2 as a parameter or may be determined in proportion to the value of the angle D2. When the sound source 53 has an angle D2 of 0 to −60 degrees, the front-back position of the sound source 53 may be determined within the range of 0 to −1.0. For example, the front-back position of the sound source 53 may be determined by a sine function which takes the angle D2 as a parameter or may be determined in proportion to the value of the angle D2. When the sound source 53 has an angle D2 of 120 to 180 degrees, the front-back position of the sound source 53 may be determined within the range of 1.0 to 0, and when the sound source 53 has an angle D2 of −120 to −180 degrees, the front-back position of the sound source 53 may be determined within the range of −1.0 to 0. For example, in the case of FIG. 8, the sound source 53 is located in front of the localization calculation microphone 61, and therefore, the front-back position of the sound source 53 is −1.0.

It is assumed that the localized position of the sound source 53 is not changed in an up-down direction (vertical direction) in the game space. Specifically, it is assumed that when the sound source 53 and the localization calculation microphone 61 are located on a predetermined plane (ground) in the game space, then even if the sound source 53 or the localization calculation microphone 61 is moved in an up-down direction (a direction perpendicular to the predetermined plane) in the game space, the localized position of the sound source 53 is not changed.

Figure 9:
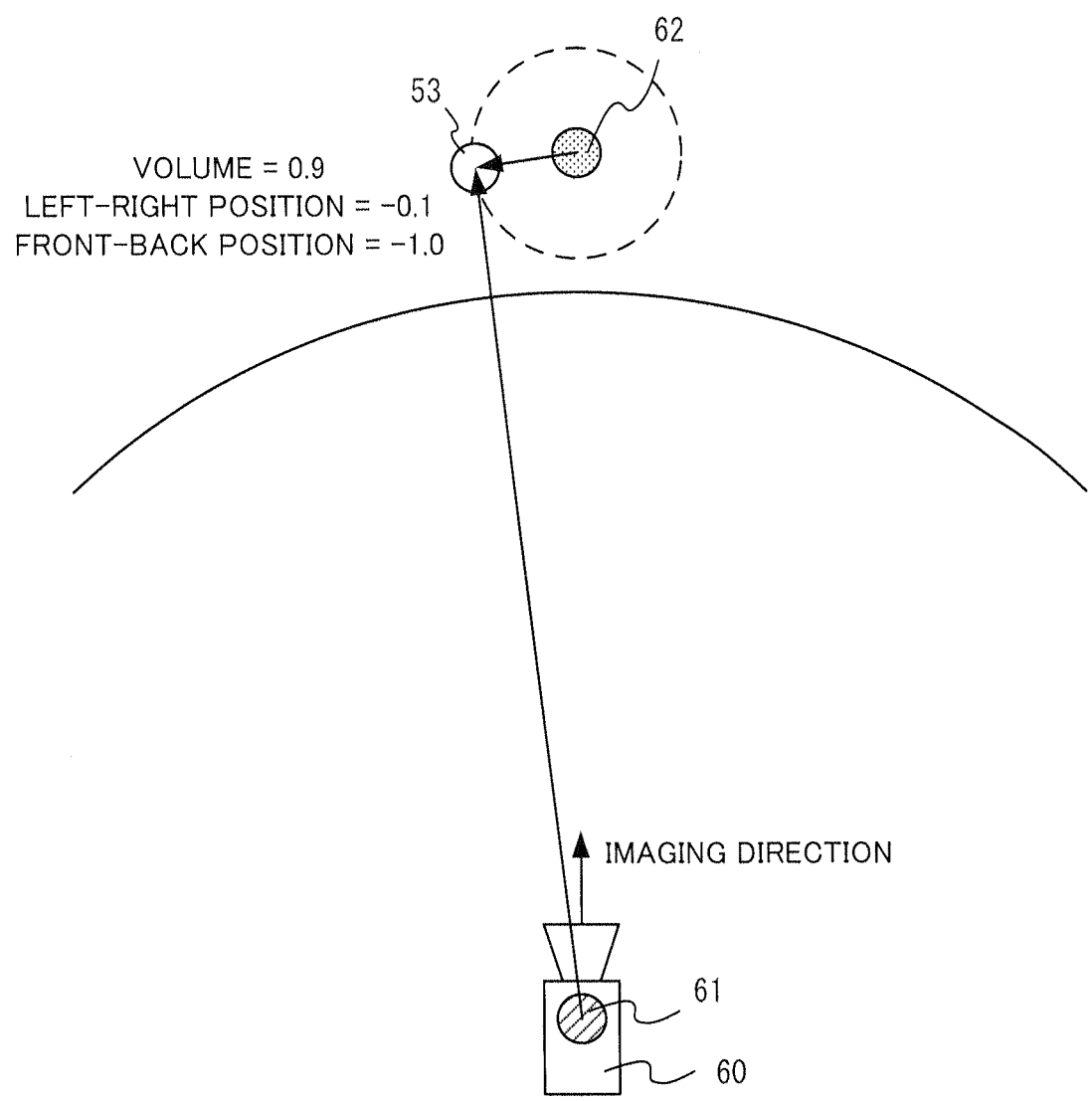
FIG. 9 is an example non-limiting diagram showing the left-right position, front-back position, and volume of the sound source 53 when a localization calculation microphone 61, the volume calculation microphone 62, and the sound source 53 have a predetermined location relationship.

FIG. 9 is an example non-limiting diagram showing the left-right position, front-back position, and volume of the sound source 53 when the localization calculation microphone 61, the volume calculation microphone 62, and the sound source 53 have a predetermined location relationship. As shown in FIG. 9, when the sound source 53 is located substantially directly in front of the virtual camera 60 and is located leftward away by a small amount from the imaging direction of the virtual camera 60, i.e., has a slightly small negative angle D1, the front-back position and left-right position of the sound source 53 are −1.0 and −0.1, respectively. When the sound source 53 is relatively close to the volume calculation microphone 62, the volume is 0.9.

When a sound of the sound source 53 is output from the loudspeaker 2a, the player can localize, or identify the location of, the sound source 53. For example, if the left-right position is 0 and the front-back position is −1, the player recognizes that the sound occurs in front of the player. If the left-right position is 0 and the front-back position is 1, the player recognizes that the sound occurs behind the player. If the left-right position is 1 and the front-back position is 0, the player recognizes that the sound occurs to the right of the player. If the left-right position is −1 and the front-back position is 0, the player recognizes that the sound occurs to the left of the player. As shown in FIG. 9, the localization calculation microphone 61 is set at the location of the virtual camera 60, and therefore, the player recognizes that a sound comes from the sound source 53 (in a direction from the sound source 53 toward the virtual camera 60), i.e., the sound is generated by the sound source 53.

On the other hand, the volume calculation microphone 62 is set based on the gazing point of the virtual camera 60. In the example of FIG. 9, the volume calculation microphone 62 is provided in the vicinity of the sound source 53. Therefore, a sound of the sound source 53 is output by the loudspeaker 2a at a relatively large volume. For example, if the volume calculation microphone 62 also serves as the localization calculation microphone 61, then when the volume calculation microphone 62 is located at the location of the virtual camera 60, the distance between the sound source 53 and the volume calculation microphone 62 (the localization calculation microphone 61) is large. Therefore, a sound of the sound source 53 has a relatively low volume. On the other hand, if the volume calculation microphone 62 also serves as the localization calculation microphone 61, then when the volume calculation microphone 62 (the localization calculation microphone 61) is set in the vicinity of the sound source 53 in order to increase the volume of a sound of the sound source 53, the localization of the sound source 53 is affected or altered. For example, if the localization calculation microphone 61 is located at the same location (FIG. 9) where the volume calculation microphone 62 is located, the sound source 53 is located substantially to the left of the localization calculation microphone 61, and therefore, the front-back position and left-right position of the sound source 53 as viewed from the localization calculation microphone 61 are 0 and −1.0, respectively. Therefore, when the player hears a sound of the sound source 53 while viewing an image captured by the virtual camera 60, the player recognizes that a sound comes from a place other than the sound source 53 displayed on the television 2 (a place to the left of the sound source 53), i.e., a sound of the sound source 53 comes from a different place or the sound is not generated from the sound source 53. Therefore, if the localization calculation microphone 61 is provided close to the sound source 53, a sound of the sound source 53 may appear unnatural to the player. However, in the game of this embodiment, the volume calculation microphone 62 and the localization calculation microphone 61 are provided separately, and the volume calculation microphone 62 is provided close to a sound source, whereby the volume of a sound of the sound source can be changed without affecting or altering the localization of the sound source.

If the volume calculation microphone 62 is provided at the same location where the localization calculation microphone 61 (the virtual camera 60) is provided, then when another object which is not covered by the virtual camera 60 is provided in the vicinity of the virtual camera 60, the volume of a sound of this object which is not displayed on the television 2 may be large. If the volume of a sound of an object which is not displayed on the television 2 is large, the player may feel unnatural or be confused. However, in this embodiment, the volume calculation microphone 62 and the localization calculation microphone 61 are provided separately. In the demonstration mode, the volume calculation microphone 62 is provided in the vicinity of the gazing point of the virtual camera 60. In the player operation mode, the volume calculation microphone 62 is provided between the player character 51 and the virtual camera 60. Therefore, the volume of a sound of an object which is not covered by the virtual camera 60 can be reduced, and the volume of a sound of an object which is located in the vicinity of the gazing point of the virtual camera 60 or around the player character 51 and the virtual camera 60 can be increased.

Figure 10:
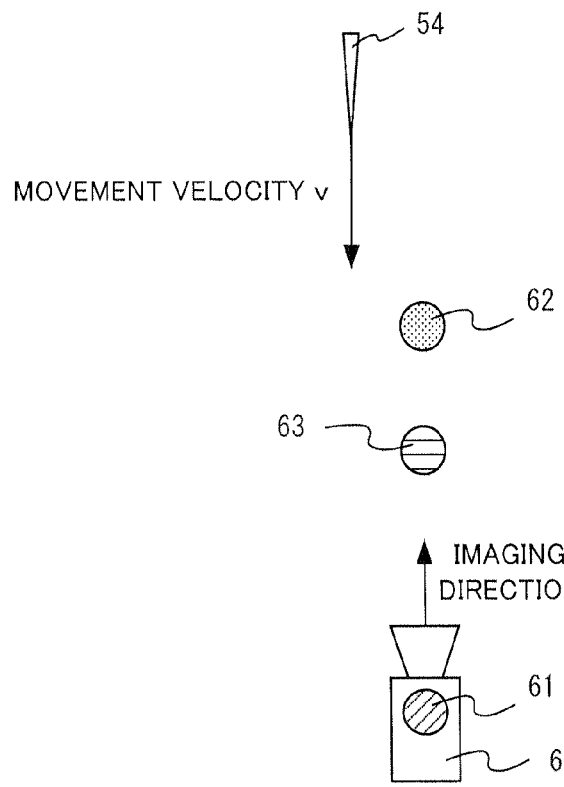
FIG. 10 is an example non-limiting diagram showing a movement of an arrow object (sound source 54) toward a virtual camera 60 in the game space as viewed from above.

Next, a process for a sound emitted by an object moving in the game space will be described. FIG. 10 is an example non-limiting diagram showing a movement of an arrow object (sound source 54) toward the virtual camera 60 in the game space as viewed from above. As shown in FIG. 10, in the game of this embodiment, the Doppler effect microphone 63 is set in the game space in addition to the localization calculation microphone 61 and the volume calculation microphone 62. The Doppler effect microphone 63 is a virtual microphone which is not displayed on the television 2. Although, in FIG. 10, the Doppler effect microphone 63 is displayed at a location away from the localization calculation microphone 61, in this embodiment the Doppler effect microphone 63 is set at the location of the localization calculation microphone 61. Therefore, the Doppler effect microphone 63 may not be internally defined, and a process described below may be performed, assuming that the localization calculation microphone 61 also serves as the Doppler effect microphone 63.

The arrow object is an object which moves at a velocity v in the game space while emitting a sound (sound effect) which is generated by the friction between the arrow and air when the arrow is moving in the air. In the game of this embodiment, the frequency of a sound emitted from the arrow object (the sound source 54) is corrected, taking into consideration the Doppler effect of the movement of the arrow object. Also, when the Doppler effect microphone 63

(the virtual camera 60) moves in the game space, the sound of the sound source 54 is corrected based on the Doppler effect. Specifically, the sound of the sound source 54 is corrected based on a relative motion of the sound source 54 and the Doppler effect microphone 63. More specifically, the frequency of the sound of the sound source 54 varies depending on the velocity of the sound source 54 and the velocity of the Doppler effect microphone 63. Therefore, for example, when the sound source 54 approaches and passes by the Doppler effect microphone 63, the sound of the sound source 54 changes.

Although, in this embodiment, the Doppler effect microphone 63 is located at the location of the localization calculation microphone 61 (the virtual camera 60), the Doppler effect microphone 63 may be located away from the localization calculation microphone 61. For example, as shown in FIG. 10, the Doppler effect microphone 63 may be located at a predetermined location in the imaging direction of the virtual camera 60. In this case, when the sound source 54 moving toward the virtual camera 60 passes by the Doppler effect microphone 63, the frequency of the sound of the sound source 54 changes. At this time, the sound source 54 is located in front of the virtual camera 60. In other words, the time that the passing of the sound source 54 is detected auditorily precedes the time that the passing of the sound source 54 is detected visually. The Doppler effect microphone 63 may be provided in the vicinity of the player character 51. In this case, the Doppler effect which is recognized at the location of the player character 51 can be reproduced.

(Process on Sound from Behind)

Figure 11:
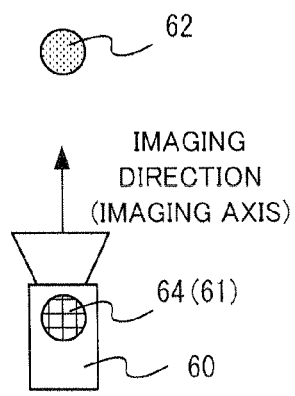
FIG. 11 is an example non-limiting diagram showing each object in the game space as viewed from above, where a sound source 52 is located behind the virtual camera 60.
Figure 11:

Next, a sound process which is performed when a sound source is located behind the virtual camera 60 will be described with reference to FIGS. 11-13. FIG. 11 is an example non-limiting diagram showing each object in the game space as viewed from above, where the sound source 52 is located behind the virtual camera 60. As shown in FIG. 11, a back filter microphone 64 is provided at the location of the virtual camera 60 (the localization calculation microphone 61). In this embodiment, when the sound source 52 is located behind the virtual camera 60 (on a side opposite to the imaging direction of the virtual camera 60), a filtering process is performed on a sound of the sound source 52. In the filtering process, a frequency filter (a low-pass filter, a band-pass filter, a high-pass filter, etc.) is applied to the sound so that the volume of a specific frequency component is reduced or a specific frequency component is removed. For example, in the filtering process employing a low-pass filter, components higher than or equal to a predetermined frequency are removed. In this embodiment, a low-pass filter or a band-pass filter is used to remove higher frequency components, whereby a sound coming from the virtual camera 60 is muffled.

Figure 12:
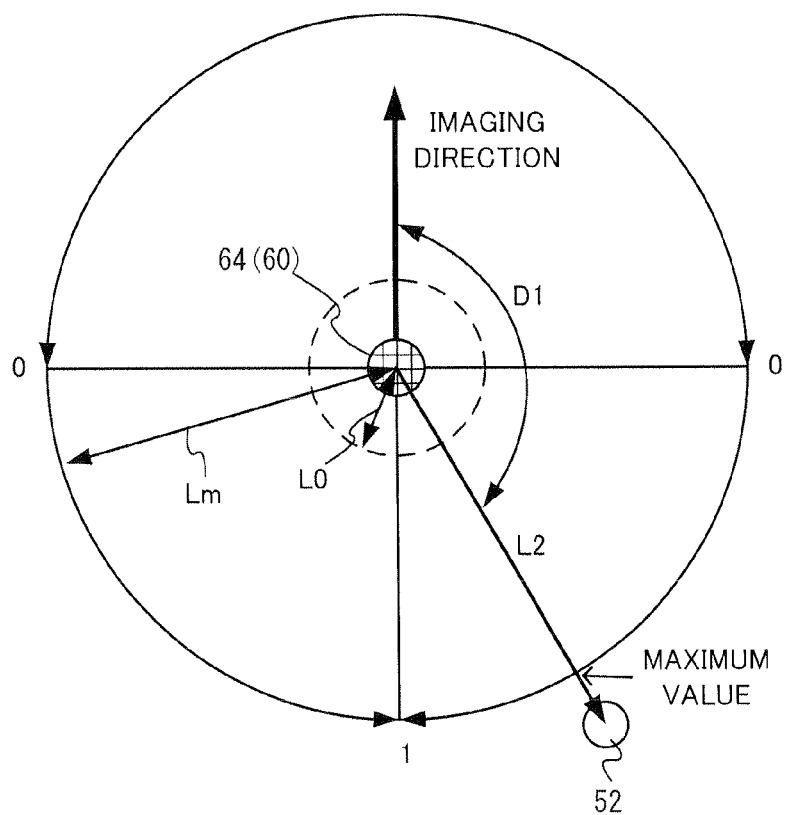
FIG. 12 is an example non-limiting diagram showing a filter value based on a location relationship between a back filter microphone 64 and the sound source 52.
Figure 13:
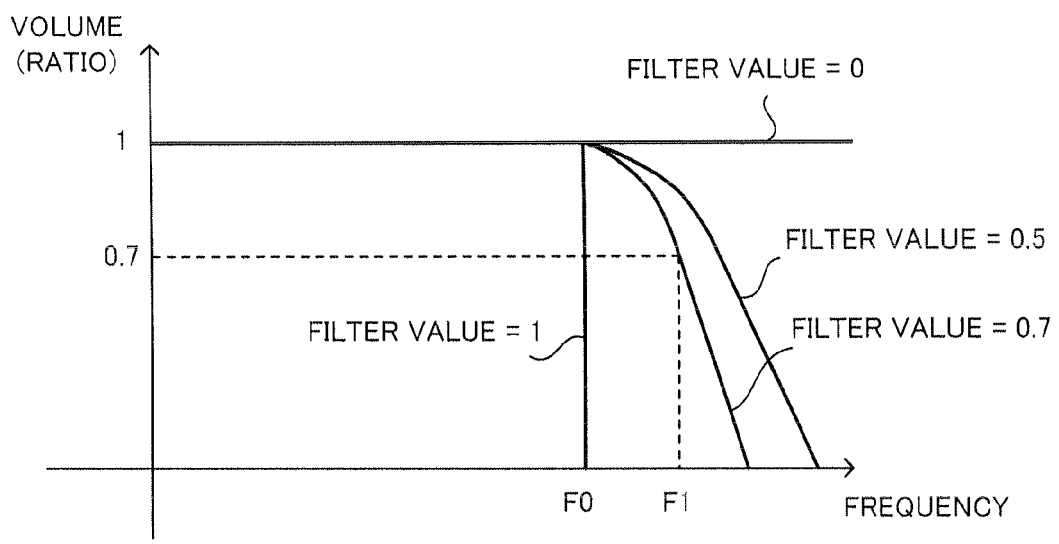
FIG. 13 is an example non-limiting diagram showing frequency filtering, where different filter values are used.

FIG. 12 is an example non-limiting diagram showing a filter value based on a location relationship between the back filter microphone 64 and the sound source 52. As shown in FIG. 12, when the sound source 52 is located in front of the virtual camera 60 (the back filter microphone 64), the filter value is set to zero. In this case, a filter is not applied to a sound of the sound source 52, and therefore, the sound is directly output from the loudspeaker 2a. The filter value indicates the degree of filtering (the degree of correction) of a sound. The filter value will be described below.

On the other hand, when the sound source 52 is located behind the virtual camera 60, the filter value is set within the range of 0 to 1. Specifically, initially, an angle D1 between the imaging direction vector of the virtual camera 60 and a vector from the back filter microphone 64 toward the sound source 54 is calculated. Also, a distance L2 between the back filter microphone 64 and the sound source 52 is calculated. Thereafter, the filter value is calculated based on the angle D1 and the distance L2. Specifically, when the absolute value of the angle D1 is 0 to 90 degrees, the filter value is set to 0. When the absolute value of the angle D1 is 90 to 180 degrees, then if the distance L2 is larger than or equal to a threshold value Lm, the filter value is set to a maximum value (≤1) which depends on the absolute value of the angle D1. When the absolute value of the angle D1 is 90 to 180 degrees, then if the distance L2 is smaller than the threshold value Lm, the filter value is calculated by correcting (reducing), based on the distance L2, the maximum value depending on the angle D1. For example, the maximum value depending on the angle D1 may be determined in proportion to the angle D1 or using a sine function which takes the angle D1 as a parameter. For example, when the absolute value of the angle D1 is 180 degrees, the maximum value of the filter value is set to 1. When the distance L2 is smaller than the threshold value Lm, the filter value may be calculated by dividing the distance L2 by the threshold value Lm, for example. For example, when the absolute value of the angle D1 is 135 degrees, the maximum value may be set to 0.5, and when the distance L2 is ½ of the threshold value Lm, the filter value may be set to ½ of the maximum value, i.e., 0.25.

Note that when the distance L2 between the back filter microphone 64 and the sound source 52 is smaller than a threshold value L0 (<Lm), then even if the absolute value of the angle D1 is greater than 90 degrees, i.e., the sound source 52 is located behind the virtual camera 60, the filter value is set to 0. Therefore, when the sound source 52 is located within the range of the threshold value L0 from the back filter microphone 64, a sound of the sound source 52 is directly output from the loudspeaker 2a without applying a filter to the sound.

As used herein, the term "filter value" refers to the degree of correction of a sound of a sound source. FIG. 13 is an example non-limiting diagram showing frequency filtering, where different filter values are used. In FIG. 13, the horizontal axis indicates frequencies, and the vertical axis indicates volume ratios. As shown in FIG. 13, when the filter value is 0, the volume ratio is 1 over all frequencies. Therefore, the volume of each frequency component of a sound is maintained, and a sound of a sound source is directly output from the loudspeaker 2a. On the other hand, when the filter value is, for example, 0.5, the volumes of frequency components higher than a specific frequency F0 are corrected based on a curve indicated by the filter value of 0.5. For example, as shown in FIG. 13, when the filter value is 0.7, the volume of a component having a frequency F1 is set to be 0.7 times as large as the volume before correction. For example, when the filter value is 1, the volumes of components having the frequency F0 or higher are set to 0, and therefore, the components having the frequency F0 or higher are removed. Thus, a sound is corrected using a filter value, and the corrected sound is output from the loudspeaker 2a. Specifically, when the low-pass filter of FIG. 13 is applied to a sound, higher frequency components of the sound are removed or attenuated, and therefore, the corrected sound becomes muffled. Note that the filter curves of FIG. 13 (the curve portions at the frequency F0 or higher) may have any shape. For example, the portion at the frequency F0 or higher may be in the shape of a straight line or a curve which converges to a predetermined volume (ratio). Although, in FIG. 13, the vertical axis indicates volume ratios, the vertical axis may indicate values by which the volume is reduced.

As described above, in this embodiment, when a sound source is located behind the virtual camera 60 (the absolute value of the angle D1 is within the range of 90 to 180 degrees), a frequency filter is applied to a sound of the sound source. Specifically, as the sound source is located closer to a location directly behind the virtual camera 60 (i.e., the absolute value of the angle D1 is closer to 180 degrees), the filter value increases (the degree of correction increases). In addition, as the sound source is located further away from the virtual camera 60, the filter value increases (the degree of correction increases). As a result, as the sound source is located closer to a location directly behind the virtual camera 60 (i.e., the absolute value of the angle D1 is closer to 180 degrees), the sound of the sound source becomes more muffled, and as the sound source is located further away from the virtual camera 60, the sound of the sound source becomes more muffled. Therefore, the player can recognize a direction in which the sound source is located (where the sound source is located on a side opposite to the imaging direction of the virtual camera 60). When a sound source is located behind the virtual camera 60, the sound source is not displayed on the television 2. Therefore, if a sound of an object which is not displayed is muffled, the player is allowed to pay attention to another object which is displayed on the television 2. Also, even when there are a plurality of identical sound sources in the game space, the player can listen to a sound of an object displayed on the television 2 without being confused.

(Details of Game Process)

Figure 14:
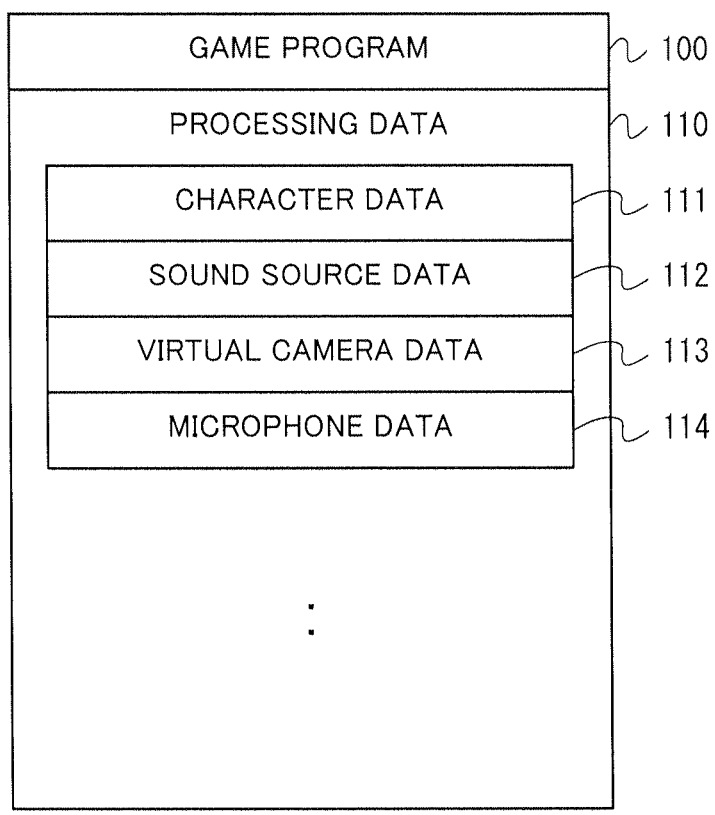
FIG. 14 is an example non-limiting diagram showing various data items used in a game process.

Next, details of the game process executed in this game system will be described. Firstly, various data items used in the game process will be described. FIG. 14 is an example non-limiting diagram showing various data items used in the game process. FIG. 14 shows main data items stored in a main memory (the external main memory 12 or the internal main memory 11*d*) of the game device 3. As shown in FIG. 14, the main memory of the game device 3 stores a game program 100 and processing data 110. Note that the main memory stores, in addition to the data items of FIG. 14, other data items required for the game, such as image data of each object appearing in the game, audio data of BGM of the game, etc.

A portion of or the entire game program 100 is read from the optical disc 4 into the main memory with appropriate timing after the game device 3 is turned on. The game program 100 may be obtained from a flash memory 17 or a device external to the game device 3 (via, for example, the Internet) instead of the optical disc 4. A portion of the game program 100 may be previously stored in the game device 3.

Figure 15:
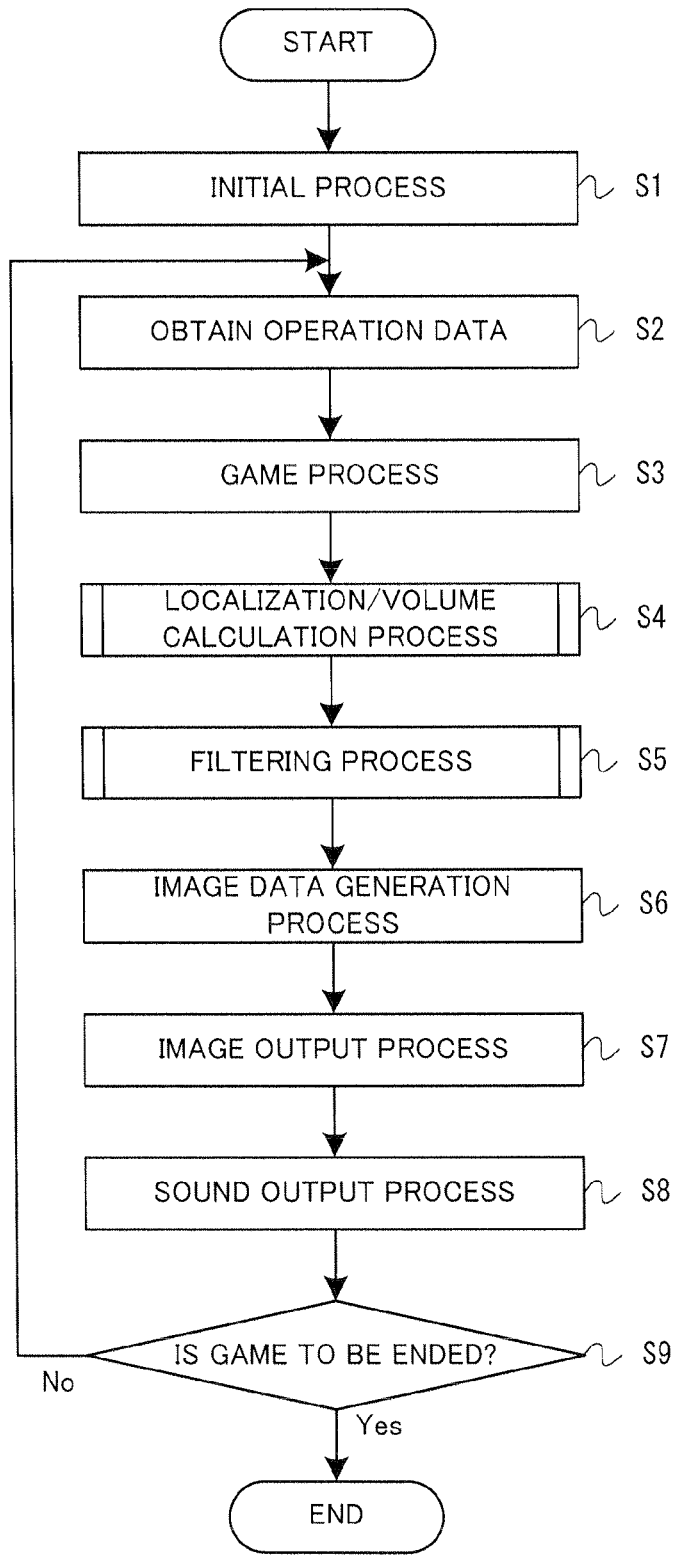
FIG. 15 is an example non-limiting main flowchart showing a flow of the game process executed in the game device 3.

The processing data 110 is used in a main process described below (FIG. 15). The processing data 110 contains character data 111, sound source data 112, virtual camera data 113, and microphone data 114.

The character data 111 contains data indicating the location and orientation in the game space of the player character 51. The character data 111 also contains data indicating the location and orientation in the game space of the character 55.

The sound source data 112 relates to each object serving as a sound source. The sound source data 112 contains data relating to the sound source 52 (waterfall object), the sound source 53 (door object), the sound source 54 (arrow object), etc. Specifically, data relating to sound sources contains data indicating the location and orientation of each sound source, data indicating the localized position of each sound source, audio data (data indicating the waveform of a sound) of each sound source, data indicating the volume of a sound of each sound source, etc.

The virtual camera data 113 contains data indicating the location, orientation, and gazing point of the virtual camera 60.

The microphone data 114 relates to each microphone. Specifically, the microphone data 114 contains data relating to the localization calculation microphone 61, the volume calculation microphone 62, the Doppler effect microphone 63, and the back filter microphone 64. More specifically, the microphone data 114 contains data indicating the location and orientation of the localization calculation microphone 61, data indicating the location and orientation (or only the location) of the volume calculation microphone 62, data indicating the location and orientation (or only the location) of the Doppler effect microphone 63, and data indicating the location and orientation of the back filter microphone 64. Note that, in this embodiment, the localization calculation microphone 61 and the virtual camera 60 have the same location and orientation. The Doppler effect microphone 63 and the localization calculation microphone 61 have the same location and orientation. The back filter microphone 64 and the localization calculation microphone 61 have the same location and orientation. In other words, the microphones 61, 63, and 64 have the same location and orientation as those of the virtual camera 60. Therefore, the data relating to the localization calculation microphone 61, the Doppler effect microphone 63, and the back filter microphone 64 may not be stored in the main memory. In other words, the virtual camera data 113 may be used as the data relating to the microphones 61, 63, and 64 in the main process described below.

(Description of Flowchart)

Next, the game process executed in the game device 3 will be described in detail with reference to FIGS. 15-17. FIG. 15 is an example non-limiting main flowchart showing a flow of the game process executed in the game device 3. When the game device 3 is turned on, the CPU 10 of the game device 3 executes a boot program stored in a boot ROM (not shown) to initialize units such as the main memory. The game program stored in the optical disc 4 is read into the main memory, and the CPU 10 begins to execute the game program. The CPU 10 also reads audio data of a sound source stored on the optical disc 4 into the main memory. The process of the flowchart of FIG. 15 is executed after the above process has been completed.

Figure 16:
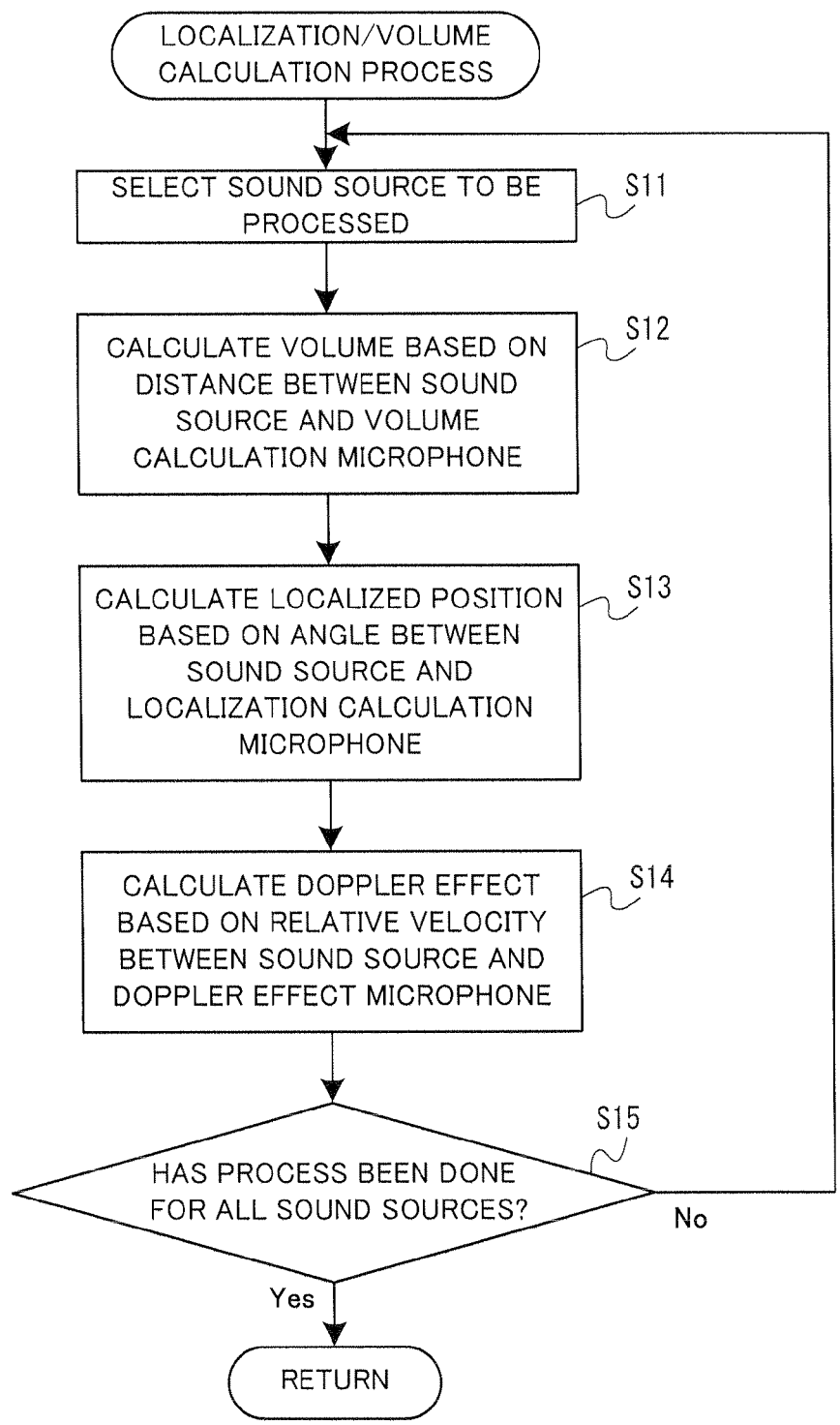
FIG. 16 is an example non-limiting flowchart showing a detailed flow of a localization/volume calculation process (step S4) of FIG. 15.
Figure 17:
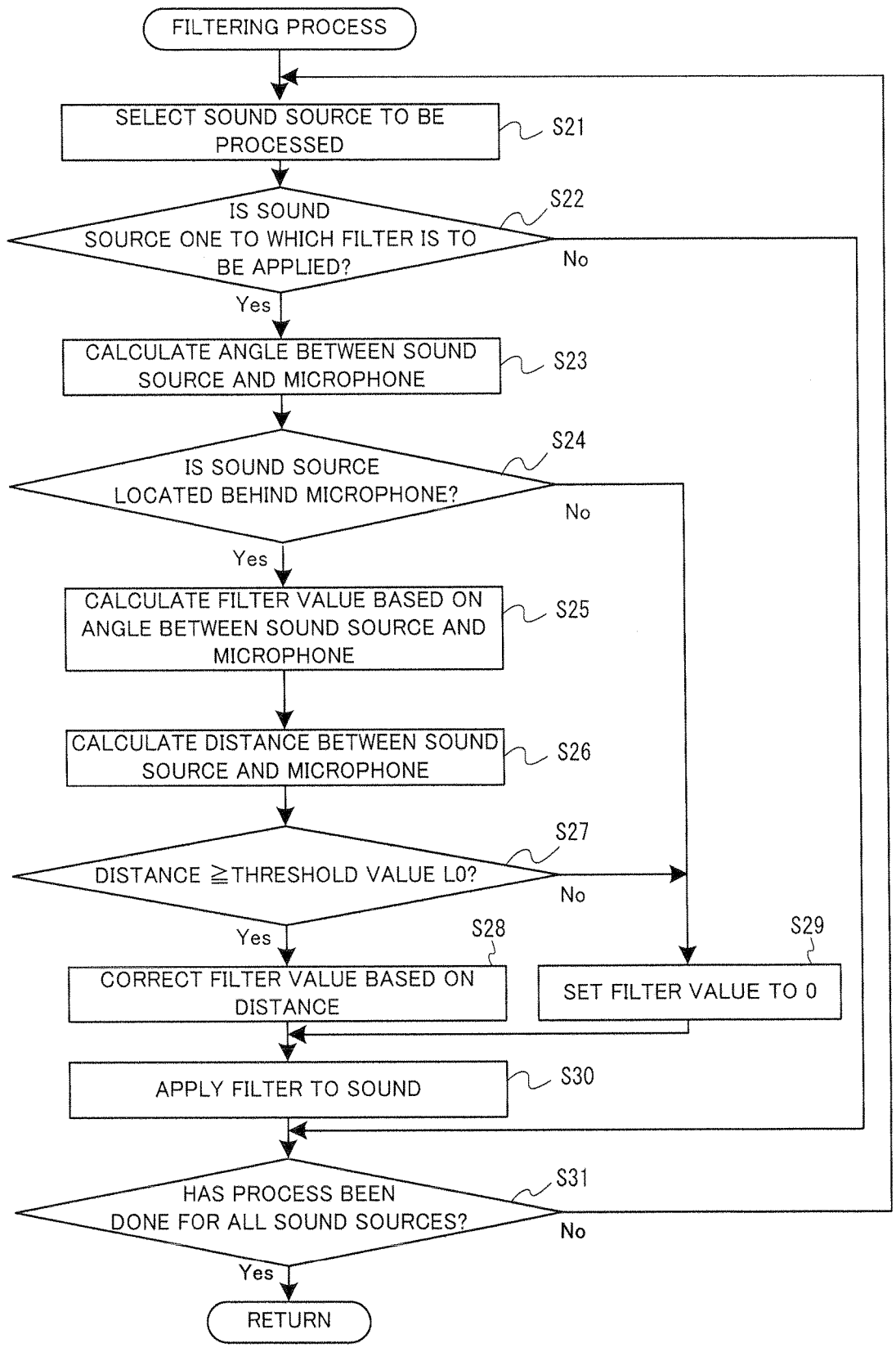
FIG. 17 is an example non-limiting flowchart showing a detailed flow of a filtering process (step S5) of FIG. 15.

The steps of the flowcharts of FIGS. 15-17 are merely illustrative, and the order in which the steps are performed may be changed as long as similar advantages are obtained. The values of variables and constants, etc., are also merely illustrative, and other values may be optionally used. In this embodiment, it is assumed that the steps of the flowcharts are executed by the CPU 10. Alternatively, a portion of the steps may be executed by a processor or a dedicated circuit other than the CPU 10.

In step S1, the CPU 10 executes an initial process. In the initial process, the CPU 10 sets the game mode to the player operation mode or the demonstration mode based on the player's selection. The CPU 10 also constructs a three-dimensional game space, arranges at initial locations the player character 51, the character 55, the sound sources 52-54, the localization calculation microphones 61-64, the virtual camera 60, and other objects appearing in the game space. The CPU 10 also sets various parameters used in the game process to initial values. After step S1, the CPU 10 executes step S2. Thereafter, a loop of steps S2-S9 is repeatedly executed at a rate of once per predetermined period of time (one frame time, e.g., 1/60 sec).

In step S2, the CPU 10 obtains operation data which has been transmitted from the controller 5 and stored in the main memory. The controller 5 repeatedly transmits operation data (data relating to an operation performed on each button, etc.) to the game device 3 at predetermined intervals. In the game device 3, the controller communication module 19 sequentially receives operation data, which is then sequentially stored into the main memory. In step S2, the CPU 10 reads latest operation data from the main memory. After step S2, step S3 is executed.

In step S3, the CPU 10 executes the game process. In the game process, the CPU 10 moves the player character 51 in the game space, changes the orientation of the player character 51, and changes the location and/or orientation of the virtual camera 60 based on the operation data obtained in step S2. The CPU 10 also changes the location and/or orientation of each microphone (61-63). The CPU 10 also moves the sound source 54 and other objects (e.g., an enemy character, etc.). Note that when the game device 3 is operating in the demonstration mode, the CPU 10 moves the character 55 and changes the location and orientation of the virtual camera 60 in accordance with a predetermined algorithm. Next, the CPU 10 executes step S4.

In step S4, the CPU 10 executes a localization/volume calculation process. In the localization/volume calculation process, the CPU 10 calculates the localized position and volume of each sound source. The localization/volume calculation process will be described in detail hereinafter with reference to FIG. 16.

FIG. 16 is an example non-limiting flowchart showing a detailed flow of the localization/volume calculation process (step S4) of FIG. 15.

In step S11, the CPU 10 selects one sound source (e.g., the sound source 52a) to be processed from a plurality of sound sources provided in the game space. After step S11, the CPU 10 executes step S12. Note that if there is no sound source object in the game space, the CPU 10 ends the localization/volume calculation process.

In step S12, the CPU 10 calculates the volume of a sound based on the distance between the sound source selected in step S11 and the volume calculation microphone 62. Specifically, the CPU 10 calculates the distance between the sound source and the volume calculation microphone 62 based on the location of the sound source and the location of the volume calculation microphone 62 which are obtained by referencing the main memory. Thereafter, the CPU 10 calculates the volume based on the distance. More specifically, as described above, the CPU 10 calculates the volume so that the volume decreases with an increase in the distance (the volume decreases in proportion to the distance). The calculated volume is stored in the main memory. Next, the CPU 10 executes step S13.

In step S13, the CPU 10 calculates the localized position of the sound source selected in step S11 based on the angle between the sound source and the localization calculation microphone 61. Specifically, the CPU 10 calculates the localized position (the left-right position and the front-back position) of the sound source based on the location and orientation of the localization calculation microphone 61 and the location of the sound source which are obtained by referencing the main memory. More specifically, the CPU 10 calculates the angle D1 (FIG. 7) and the angle D2 to calculate the left-right position and front-back position of the sound source. The calculated localized position is stored in the main memory. Next, the CPU 10 executes step S14.

In step S14, the CPU 10 calculates the Doppler effect based on the relative velocity between the sound source selected in step S11 and the Doppler effect microphone 63. Specifically, the CPU 10 corrects frequency components of a sound of the selected sound source based on the relative velocity. The result of calculation of the Doppler effect is stored in the main memory. Next, the CPU 10 executes step S15.

In step S15, the CPU 10 determines whether or not the process has been executed for all sound sources. By repeatedly executing steps S11-S15, the process is executed for all sound sources provided in the game space. If the determination result is negative, the CPU 10 executes step S11 again. On the other hand, if the determination result is positive, the CPU 10 ends the localization/volume calculation process.

Referring back to FIG. 15, next, in step S5, the CPU 10 executes the filtering process. In the filtering process of step S5, the CPU 10 applies a frequency filter to a sound of a sound source which is provided behind the virtual camera 60 (the back filter microphone 64). The filtering process will be described in detail hereinafter with reference to FIG. 17.

FIG. 17 is an example non-limiting flowchart showing a detailed flow of the filtering process (step S5) of FIG. 15.

In step S21, the CPU 10 selects one sound source (e.g., the sound source 52a) to be processed from a plurality of sound sources provided in the game space. After step S21, the CPU 10 executes step S22. Note that if there is no sound source object in the game space, the CPU 10 ends the filtering process.

In step S22, the CPU 10 determines whether or not the sound source selected in step S21 is one to which a filter is to be applied. Whether or not a sound source is one to which a filter is to be applied is previously determined, and for example, is determined based on the type of the sound source. For example, if the sound source selected in step S21 is the sound source 52 (waterfall object), the CPU 10 determines that the sound source is one to which a filter is to be applied. Note that if a single sound source outputs a plurality of kinds of sound, for each kind of sound it may be determined whether or not the sound is one to which a filter is to be applied. In this case, it is previously determined whether or not a sound is one to which a filter is to be applied, according to the kind of the sound. If the determination result is positive, the CPU 10 next executes step S23. On the other hand, if the determination result is negative, the CPU 10 next executes step S31.

In step S23, the CPU 10 calculates an angle between the sound source and the microphone. Specifically, the CPU 10 calculates the angle D1 (see FIG. 12) between the sound source and the back filter microphone 64 (the virtual camera 60) based on the location and orientation of the back filter microphone 64 (the virtual camera 60) and the location of the sound source which are obtained by referencing the main memory. Next, the CPU 10 executes step S24.

In step S24, the CPU 10 determines whether or not the sound source is located behind the back filter microphone 64. Specifically, the CPU 10 determines whether or not the absolute value of the angle D1 between the sound source and back filter microphone 64 calculated in step S23 is greater than 90 degrees. If the determination result is positive, the CPU 10 next executes step S25. On the other hand, if the determination result is negative, the CPU 10 next executes step S29.

In step S25, the CPU 10 calculates a filter value based on the angle D1 between the sound source and the back filter microphone 64. Here, as shown in FIG. 12, the CPU 10 calculates a maximum value (within the range of 0 to 1.0) of the filter value based on the angle D1 between the sound source and the back filter microphone 64. For example, the CPU 10 calculates the maximum value of the filter value in proportion to the angle D1. Next, the CPU 10 executes step S26.

In step S26, the CPU 10 calculates a distance between the sound source and the back filter microphone 64. Specifically, the CPU 10 calculates the distance L2 (see FIG. 12) between the sound source and the back filter microphone 64 by referencing the main memory. Next, the CPU 10 executes step S27.

In step S27, the CPU 10 determines whether or not the distance L2 between the sound source and the back filter microphone 64 calculated in step S26 is larger than or equal to the threshold value L0 (see FIG. 12). If the determination result is positive, the CPU 10 next executes S28. On the other hand, if the determination result is negative, the CPU 10 next executes S29.

In step S28, the CPU 10 corrects the filter value based on the distance L2 between the sound source and the back filter microphone 64 calculated in step S26. Here, the CPU 10 corrects the maximum value of the filter value calculated in step S25 based on the distance L2. If the distance L2 between the sound source and the back filter microphone 64 is larger than or equal to the threshold value Lm (see FIG. 12), the CPU 10 sets the filter value to the maximum value calculated in step S25. If the distance L2 between the sound source and the back filter microphone 64 is smaller than the threshold value Lm, for example the CPU 10 multiplies the maximum value calculated in step S25 by a value obtained by dividing the distance L2 by the threshold value Lm, to correct the maximum value of the filter value calculated in step S25. The corrected filter value is stored in the main memory. Next, the CPU 10 executes S30.

On the other hand, in step S29, the CPU 10 sets the filter value to zero. Here, because the sound source is not located behind the back filter microphone 64 or the distance L2 between the sound source and the back filter microphone 64 is smaller than the threshold value L0, the CPU 10 sets the filter value to zero. As a result, when sound reproduction is performed, a sound to which no filter has been applied is output from the loudspeaker 2a. After step S29, the CPU 10 next executes step S30.

In step S30, the CPU 10 applies a frequency filter to a sound. Here, the CPU 10 applies, to a sound of the sound source, a filter (see FIG. 13) corresponding to the filter value calculated in step S28. As a result, components higher than or equal to a predetermined frequency may be removed (the volumes thereof are set to zero), or the volumes of components higher than or equal to a predetermined frequency may be attenuated. After step S30, the CPU 10 next executes step S31.

In step S31, the CPU 10 determines whether or not the process has been executed for all sound sources. By repeatedly executing steps S21-S31, the process is executed for all sound sources provided in the game space. If the determination result is negative, the CPU 10 executes step S21 again. On the other hand, if the determination result is positive, the CPU 10 ends the filtering process of FIG. 17.

Referring back to FIG. 15, the CPU 10 next executes an image data generation process in step S6. In step S6, an image to be displayed on the television 2 is generated. Specifically, the CPU 10 shoots the game space using the virtual camera 60 to generate image data. Next, the CPU 10 executes step S7.

In step S7, the CPU 10 executes an image output process. Here, the image data generated in step S6 is output to the television 2. As a result, a game image is displayed on a screen of the television 2. Next, the CPU 10 executes step S8.

In step S8, the CPU 10 executes an audio output process. By executing step S8, a sound as a result of steps S4 and S5 is output from the loudspeaker 2a. Specifically, audio data is generated based on the localized position and volume of the sound source and the Doppler effect calculated in step S4, and moreover, is corrected based on the result of the filtering process of step S5. Thereafter, the CPU 10 outputs the audio data via the system LSI 11 to the AV-IC 15. As a result, a sound is output from the loudspeaker 2a. Next, the CPU 10 executes step S9.

In step S9, the CPU 10 determines whether or not the game is to be ended. The determination in step S9 is performed based on, for example, whether or not the game is over (or cleared), or whether or not the user issues an instruction to end the game, etc. If the determination result of step S9 is negative, step S2 is executed again. On the other hand, if the determination result of step S9 is positive, the CPU 10 ends the main process of FIG. 15.

As described above, in the game of this embodiment, a sound of a sound source provided in the game space is corrected before being output from the loudspeaker 2a. Specifically, the localized position (direction) of a sound source is calculated with reference to the location of the localization calculation microphone 61 (the virtual camera 60). The volume of the sound is calculated based on the distance between the sound source and the volume calculation microphone 62 which is provided separately from the localization calculation microphone 61. Thereafter, the sound corresponding to the calculated localized position of the sound source and the calculated volume is output from the loudspeaker 2a. In this embodiment, the localization calculation microphone 61 is located at the location of the virtual camera 60, and the volume calculation microphone 62 is located in the vicinity of the gazing point of the virtual camera 60 (a predetermined location in the imaging direction of the virtual camera 60). Therefore, the volume of the sound of the sound source can be increased while the localized position of the sound source displayed in the vicinity of the center of the television 2 with reference to the virtual camera 60 is maintained. As a result, the player is allowed to pay attention to a predetermined object in the game space both visually and auditorily, and even when a large number of objects emitting a sound are provided in the game space, the player is allowed to pay attention to a specific object without being confused.

In the player operation mode, the volume calculation microphone 62 is provided between the player character 51 and the virtual camera 60. Therefore, the volume of a sound of a sound source provided around the player character 51 can be further increased. For example, if the volume calculation microphone 62 is provided at the location of the virtual camera 60 (the localization calculation microphone 61 and the volume calculation microphone 62 are provided at the same location), the volume of a sound of an object which is not covered by the virtual camera 60 is increased, so that the volume of a sound around the player character 51 is decreased. Therefore, the player may feel unnatural, or if there are a large number of sound sources, the player may be confused. However, in the above embodiment, the volume calculation microphone 62 is provided between the player character 51 and the virtual camera 60, a large volume of sound can be reproduced from the vicinity of the player character 51, and therefore, the player can play the game without an unnatural sensation.

In the demonstration mode, the volume calculation microphone 62 is provided in the vicinity of the gazing point of the virtual camera 60. Therefore, the volume of a sound of an object or region gazed by the virtual camera 60 can be increased while the volumes of sounds of other regions can be decreased, whereby the audience is allowed to pay attention to the object.

Also, in this embodiment, a filtering process is performed on a sound of a sound source located behind the virtual camera 60. Specifically, as the sound source is located closer to a location directly behind the virtual camera 60, the sound of the sound source is further corrected. Also, as the sound source is located further away from the virtual camera 60, the sound of the sound source is further corrected. Specifically, in this embodiment, as the angle between the sound source and the virtual camera 60 increases (the angle approaches 180 degrees) or the distance between the virtual camera 60 and the sound source increases, the sound of the sound source is further corrected (the sound of the sound source is further attenuated). As a result, a sound of an object which is located behind the virtual camera 60 and therefore is not displayed on the television 2 can be muffled and thereby distinguished from a sound occurring in front of the microphone.

For example, in order to differentiate sounds coming from a front direction and a back direction in the virtual three-dimensional space from each other, the virtual surround sound technique in which a phase difference or a time difference, etc., between two loudspeakers (stereo loudspeakers) is used, or the 5.1 channel surround sound technique in which loudspeakers are actually provided in front of and behind the audience, etc., may be employed. However, in the virtual surround sound technique and the 5.1 channel surround sound technique, two or more loudspeakers are required, and the distance between each loudspeaker and the location relationship between the loudspeakers and the audience need to satisfy predetermined conditions. Moreover, the 5.1 channel surround sound technique requires dedicated hardware, and the virtual surround sound technique requires complicated calculation. However, in this embodiment, in the filtering process, a sound can be corrected with a relatively low load and without the need of complicated calculation, and in addition, a monaural loudspeaker can be used to differentiate sounds coming from front and back directions.

(Variations)

The above embodiment is merely illustrative. In other embodiments, the following configurations may be provided, for example.

For example, in the above embodiment, the localization calculation microphone 61 and the volume calculation microphone 62 are provided separately, and the volume calculation microphone 62 is located at a predetermined location on the imaging axis of the virtual camera 60. In another embodiment, the volume calculation microphone 62 may be located at a predetermined location on a surface perpendicular to the imaging axis of the virtual camera 60 instead of being located on the imaging axis of the virtual camera 60. In other words, the volume calculation microphone 62 may be located at a predetermined location (an imaging range which is not limited to the imaging axis) within the imaging range of the virtual camera 60.

In the above embodiment, the volume calculation microphone 62 is located at a predetermined location between the localization calculation microphone 61 (the virtual camera 60) and the gazing point of the virtual camera 60 (the location of the player character 51). In another embodiment, the volume calculation microphone 62 may be located at the same location where the gazing point of the virtual camera 60 is located, or may be located further than the gazing point in the imaging direction of the virtual camera 60.

In the above embodiment, the localization calculation microphone 61 is located at the same location where the virtual camera 60 is located. In another embodiment, the localization calculation microphone 61 does not necessarily need to be located at the location of the virtual camera 60. For example, the localization calculation microphone 61 may be located based on the location of a player object (the localization calculation microphone 61 may be located at the same location where the player object is located, or at a location where the localization calculation microphone 61 and the player object have a predetermined relationship).

In the above embodiment, the volume calculation microphone 62 is located based on the gazing point of the virtual camera 60. Specifically, in the player operation mode, the gazing point is set at the player character 51, and the volume calculation microphone 62 is set between the player character 51 and the virtual camera 60. In the demonstration mode, the volume calculation microphone 62 is located in the vicinity of the gazing point of the virtual camera 60. In another embodiment, the volume calculation microphone 62 may be located away from the gazing point of the virtual camera 60, and for example, may be moved by the player's operation. For example, a microphone object indicating the volume calculation microphone 62 may be displayed on the television 2, and may be moved in the game space by the player's operation. When the player desires to pay attention to a sound of a specific sound source, the player may be allowed to increase the volume of the sound of the specific sound source by moving the microphone object.

In the above embodiment, the Doppler effect microphone 63 is located at the same location where the localization calculation microphone 61 is located. In another embodiment, the Doppler effect microphone 63 and the localization calculation microphone 61 may not be located at the same location. For example, the Doppler effect microphone 63 may be provided in the vicinity of the player character 51.

In the above embodiment, the localized position of a sound source is represented by a left-right position and a front-back position which are each represented by a predetermined value (a value within the range of −1.0 to 1.0) corresponding to the angle between the sound source and the localization calculation microphone 61. In another embodiment, the localized position of a sound source may be calculated in any manner as long as a location relationship between the sound source and the localization calculation microphone 61 is represented. For example, the localized position of a sound source may be represented by coordinate values of a coordinate system fixed to the localization calculation microphone 61. The localized position of a sound source may indicate a direction of the sound source, or the direction and distance of the sound source, with reference to the localization calculation microphone 61.

In the above embodiment, the localized position of a sound source is calculated only in the left-right direction and the front-back direction. Specifically, in the above embodiment, a localized position on a two-dimensional plane (ground) is calculated, and it is assumed that even when a sound source or the localization calculation microphone 61 is moved in an up-down direction in the virtual space, the localized position of the sound source is not changed. In another embodiment, the localized position of a sound source may be calculated in up-down direction. Specifically, in another embodiment, the localized position of a sound source may be three-dimensionally calculated based on a location relationship between the sound source and the localization calculation microphone 61 in the virtual three-dimensional space. In this case, a sound may be reproduced based on the calculated localized position of the sound source in an environment in which a loudspeaker(s) is provided in a real space in an up-down direction (e.g., 7.1 channel surround sound).

In the above embodiment, the volume of a sound of a sound source varies depending on the distance from the sound source, and the volume is the same on a circle having a predetermined radius with the center of the circle located at the sound source. In another embodiment, the volume of a sound source may vary depending on the distance from the sound source and the direction of the sound source.

In the above embodiment, a low-pass filter is used as a frequency filter to reduce the volumes of components higher than or equal to a predetermined frequency, thereby correcting a sound. In another embodiment, a band-pass filter, a high-pass filter, or a band-elimination filter may be used as a frequency filter to correct a sound. In another embodiment, a sound may be corrected as follows: a frequency filter may be used to increase the volumes of components lower than or equal to (higher than or equal to or within a predetermined range of) a predetermined frequency, thereby relatively decreasing components higher than or equal to a predetermined frequency.

In another embodiment, in addition to the frequency filter, a technique for changing specific frequency characteristics (e.g., an equalizer), a multiband compressor, an effector, etc., may be used to correct a sound.

The above audio process may be performed on any other sounds (e.g., the voice of a predetermined character, etc.).

In the above embodiment, a sound of a sound source located behind the virtual camera 60 is corrected using a frequency filter. In another embodiment, a sound of a sound source in a predetermined direction (a front direction, a right direction, etc.) as viewed from the virtual camera 60 may be corrected using a frequency filter. In still another embodiment, a sound of a sound source in a predetermined direction (a front direction, a right direction, etc.) as viewed from a player character, instead of a predetermined direction as viewed from the virtual camera 60, may be corrected using a frequency filter. Specifically, a direction of a sound source as viewed from a virtual camera or a predetermined character in the virtual space (a direction of the sound source with reference to the virtual camera or the predetermined character) may be calculated, and if the calculated direction is a predetermined direction, the sound of the sound source may be corrected.

The above audio process (the process using a plurality of microphones and the process using a filter) is not limited to the above game, and may be performed in any other games. The above audio process is also not limited to games, and may be performed in specific simulation systems.

In this embodiment, the game program is executed by the game device 3. In another embodiment, the game program may be executed in a general information processing device (a personal computer, a smartphone, etc.) in addition to a game-specialized device. Specifically, in another embodiment, a general information processing device may function as a game device by executing the game program.

The game program may be stored in a storage medium such as a magnetic disk, a non-volatile memory, etc., in addition to an optical disc. The game program may be stored in a computer-readable storage medium such as a RAM, a magnetic disk, etc., on a server connected to a network, and may be provided via the network. The game program may be read as a source code into an information processing device, and may be compiled and executed when the program is executed.

In the above embodiment, the process of the flowchart is performed by the CPU 10 of the game device 3 executing the game program. In another embodiment, a portion of or the entire process may be performed using a dedicated circuit included in the game device 3 or a general-purpose processor. At least one processor may operate as a "programmed logic circuit" for executing the process.

In another embodiment, in an information processing system having a plurality of information processing devices which can communicate with each other, the plurality of information processing devices may share the load of the game process executed by the game device 3. For example, the game system may include a plurality of information processing devices connected to a network such as the Internet. Specifically, for example, a server on the network may perform a process instead of the game device 3. Thereafter, a terminal on the network may receive the process result from the server, a game image may be displayed on a display device connected to the terminal, and a game sound may be output from a loudspeaker connected to the terminal.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing an information processing program executable by a computer of an information processing device for outputting a sound of a sound source in a virtual space, the program, when executed, causing the computer to perform operations comprising:
    displaying, on a display device, an image of the virtual space captured by a virtual camera;
    calculating a direction of the sound source with reference to a first location in the virtual space, wherein the first location is set based on a location of the virtual camera;
    calculating a volume of the sound based on a second location different from the first location and a location of the sound source, wherein the second location is set within an imaging range of the virtual camera; and
    outputting the sound of the sound source based on the calculated direction and volume.

2. The non-transitory computer-readable storage medium of claim 1, wherein
    the second location is set based on a gazing point of the virtual camera.

3. The non-transitory computer-readable storage medium of claim 2, wherein
    the second location is set between the gazing point of the virtual camera and the virtual camera.

4. The non-transitory computer-readable storage medium of claim 2, wherein
    the second location is set in the vicinity of the gazing point of the virtual camera.

5. The non-transitory computer-readable storage medium of claim 1, wherein the program, when executed, further causes the computer to perform:

controlling the virtual camera based on a user's operation;

controlling the virtual camera without the user's operation; and switching a control mode of the virtual camera between a first control mode in which the virtual camera is controlled based on the user's operation and a second control mode in which the virtual camera is controlled without the user's operation, and the second location is set between a gazing point of the virtual camera and the virtual camera in the first control mode, and in the vicinity of the gazing point of the virtual camera in the second control mode.

6. The non-transitory computer-readable storage medium of claim 5, wherein an operation object set in the virtual space is controlled based on the user's operation.

7. The non-transitory computer-readable storage medium of claim 1, wherein the first location is set to a location of the virtual camera.

8. The non-transitory computer-readable storage medium of claim 1, wherein a localized position of the sound source is calculated with reference to the first location.

9. The non-transitory computer-readable storage medium of claim 1, wherein the volume of the sound is calculated so that the volume of the sound decreases with increasing distance between the second location and the sound source.

10. The non-transitory computer-readable storage medium of claim 1, wherein the program causes the computer to further execute:

calculating a relative motion of the sound source with reference to a third location fixed or movable in the virtual space, and the sound corrected based on the relative motion is output.

11. The non-transitory computer-readable storage medium of claim 1, wherein a player object controllable based on the user's operation is provided in the virtual space, and the first location is set based on a location of the player object.

12. An information processing device for outputting a sound of a sound source in a virtual space, comprising:

at least one processor being configured to control the information processing device to perform operations comprising:

displaying, on a display device, an image of the virtual space captured by a virtual camera;

calculating a direction of the sound source with reference to a first location in the virtual space, wherein the first location is set based on a location of the virtual camera;

calculating a volume of the sound based on a second location different from the first location and a location of the sound source, wherein the second location is set within an imaging range of the virtual camera; and outputting the sound of the sound source based on the calculated direction and the calculated volume.

13. An information processing system for outputting a sound of a sound source in a virtual space, comprising:

at least one processor being configured to control the information processing system to perform operations comprising:

displaying, on a display device, an image of the virtual space captured by a virtual camera;

calculating a direction of the sound source with reference to a first location in the virtual space, wherein the first location is set based on a location of the virtual camera;

calculating a volume of the sound based on a second location different from the first location and a location of the sound source, wherein the second location is set within an imaging range of the virtual camera; and outputting the sound of the sound source based on the calculated direction and the calculated volume.

14. An information processing method executable by at least one processor in an information processing system for outputting a sound of a sound source in a virtual space, comprising:

displaying, on a display device, an image of the virtual space captured by a virtual camera;

calculating a direction of the sound source with reference to a first location in the virtual space, wherein the first location is set based on a location of the virtual camera;

calculating a volume of the sound based on a second location different from the first location and a location of the sound source, wherein the second location is set within an imaging range of the virtual camera; and outputting the sound of the sound source based on the calculated direction and volume.

15. The non-transitory computer-readable storage medium of claim 1, wherein the program, when executed, further causes the computer to filter the sound of the sound source when the sound source is located behind the virtual camera.

16. The non-transitory computer-readable storage medium of claim 15, wherein a filter value for filtering the sound is calculated based on a distance between the sound source and the first location.

17. The non-transitory computer-readable storage medium of claim 1, wherein the first location is set to a location of the virtual camera and the second location is set to a location on an imaging axis of the virtual camera.

18. The information processing device of claim 12, wherein the at least one processor is further configured to control the information processing device to filter the sound of the sound source when the sound source is located behind the virtual camera.

19. The information processing device of claim 18, wherein a filter value for filtering the sound is calculated based on a distance between the sound source and the first location.

20. The information processing device of claim 12, wherein the first location is set to a location of the virtual camera and the second location is set to a location on an imaging axis of the virtual camera.

* * * * *